(12) United States Patent
Akita

(10) Patent No.: US 11,616,519 B2
(45) Date of Patent: Mar. 28, 2023

(54) ELECTRONIC APPARATUS AND METHOD

(71) Applicant: KABUSHIKI KAISHA TOSHIBA, Tokyo (JP)

(72) Inventor: Koji Akita, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/015,826

(22) Filed: Sep. 9, 2020

(65) Prior Publication Data

US 2021/0203370 A1    Jul. 1, 2021

(30) Foreign Application Priority Data

Dec. 26, 2019  (JP) .............................. JP2019-235665

(51) Int. Cl.
*H04B 1/12* (2006.01)
*H04B 1/04* (2006.01)

(52) U.S. Cl.
CPC ............. *H04B 1/12* (2013.01); *H04B 1/0475* (2013.01)

(58) Field of Classification Search
CPC ................................. H04B 1/12; H04B 1/0475
See application file for complete search history.

(56) References Cited

U.S. PATENT DOCUMENTS

| | | | | |
|---|---|---|---|---|
| 6,339,399 B1 * | 1/2002 | Andersson | ............. | H01Q 3/267 |
| | | | | 342/174 |
| 6,480,153 B1 * | 11/2002 | Jung | ...................... | H01Q 3/267 |
| | | | | 342/174 |
| 8,243,851 B2 * | 8/2012 | Kenington | ............ | H03F 1/3247 |
| | | | | 375/267 |
| 9,031,520 B2 * | 5/2015 | McCallister | .............. | H03F 1/34 |
| | | | | 455/114.3 |
| 9,985,590 B2 * | 5/2018 | Tseng | ...................... | H03F 1/025 |
| 10,700,419 B2 * | 6/2020 | Rheinfelder | ............ | H01Q 1/246 |
| 10,734,721 B2 * | 8/2020 | Ananth | ................... | H01Q 3/267 |
| 2005/0152487 A1 * | 7/2005 | Reichard | ........... | H04L 25/03133 |
| | | | | 375/350 |
| 2006/0273959 A1 * | 12/2006 | Kawasaki | .............. | H01Q 3/267 |
| | | | | 342/368 |
| 2007/0129025 A1 * | 6/2007 | Vasa | ...................... | H03F 1/3241 |
| | | | | 455/114.2 |
| 2008/0130800 A1 * | 6/2008 | Maxim | .................... | H03C 3/40 |
| | | | | 375/345 |

(Continued)

FOREIGN PATENT DOCUMENTS

JP       2000278190 A       10/2000
JP       2004208055 A       7/2004

(Continued)

OTHER PUBLICATIONS

Masterson, "Massive MIMO and Beamforming: The Signal Processing Behind the 5G Buzzwords", Analog Dialogue (vol. 51), Jun. 2017, pp. 1-5.

*Primary Examiner* — Junpeng Chen
(74) *Attorney, Agent, or Firm* — Holtz, Holtz & Volek PC

(57) ABSTRACT

According to one embodiment, an electronic apparatus includes a receiver and a signal addition circuit. The receiver receives a reception signal of a first frequency band. The signal addition circuit is configured to input the reception signal and a calibration signal of a second frequency band which is different from the first frequency band to the receiver.

19 Claims, 23 Drawing Sheets

(56) References Cited

U.S. PATENT DOCUMENTS

| | | |
|---|---|---|
| 2010/0164782 A1 | 7/2010 | Saha et al. |
| 2010/0251050 A1 | 9/2010 | Takeuchi |
| 2014/0233618 A1* | 8/2014 | Krishnan ............... H04B 17/14 375/222 |
| 2015/0118980 A1* | 4/2015 | Leung ..................... H04B 1/38 455/114.2 |
| 2016/0072457 A1* | 3/2016 | Subrahmaniyan Radhakrishnan ........................... H04W 52/0225 375/219 |
| 2016/0197660 A1 | 7/2016 | O'Keeffe et al. |
| 2017/0272180 A1 | 9/2017 | Jitsukawa et al. |
| 2018/0366815 A1* | 12/2018 | Rheinfelder ........... H01Q 1/246 |
| 2019/0148829 A1* | 5/2019 | Ananth .................. H01Q 3/267 342/174 |
| 2019/0199454 A1* | 6/2019 | Komatsuzaki ....... H04B 1/0053 |
| 2020/0136660 A1* | 4/2020 | Behzad ............. H04B 17/3912 |
| 2020/0169434 A1* | 5/2020 | Tangudu .............. H04B 1/0028 |

FOREIGN PATENT DOCUMENTS

| | | |
|---|---|---|
| JP | 2004328286 A | 11/2004 |
| JP | 2009118028 A | 5/2009 |
| JP | 2012514407 A | 6/2012 |
| JP | 2017175207 A | 9/2017 |
| JP | 2019114961 A | 7/2019 |

\* cited by examiner

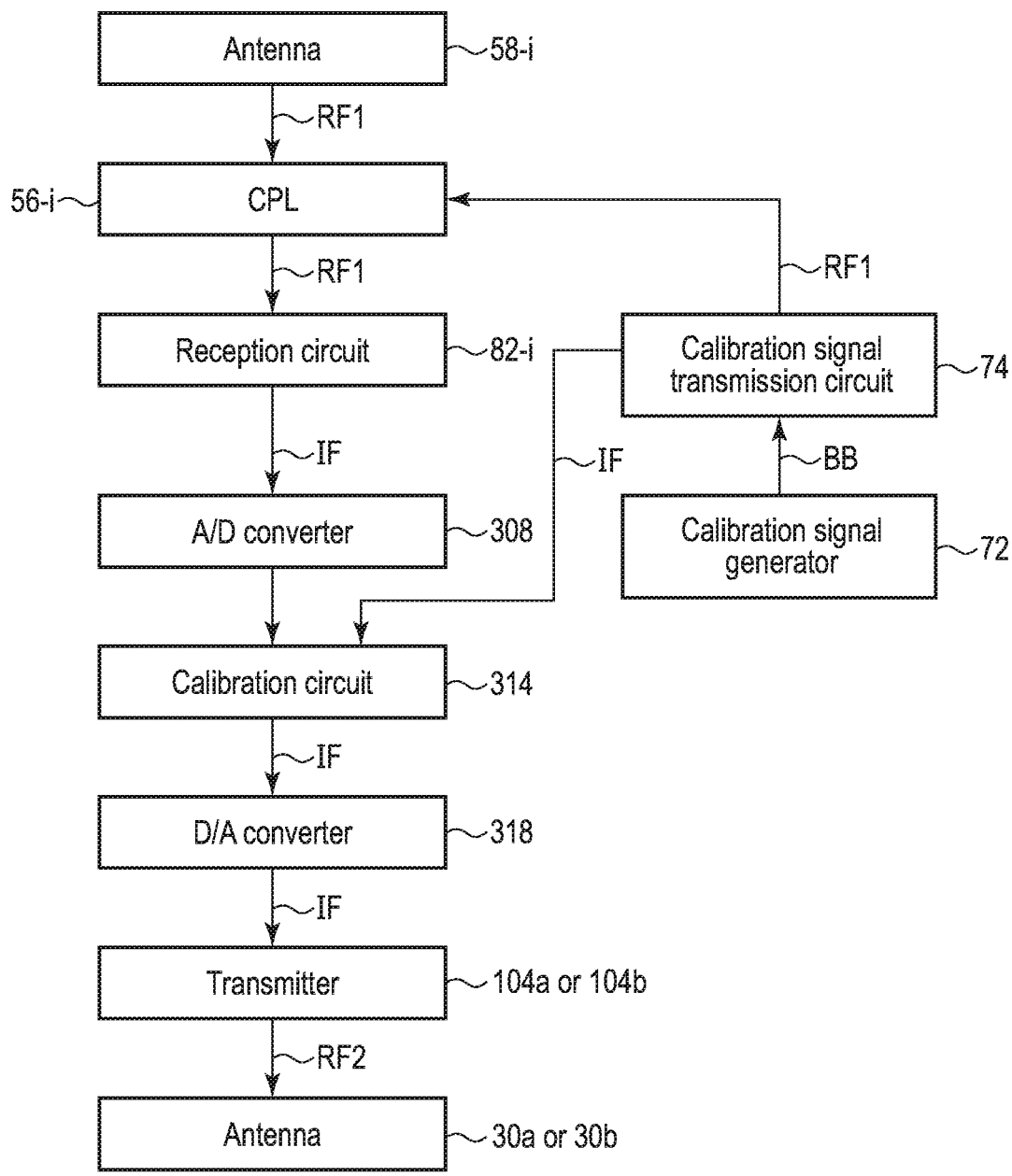
F I G. 12

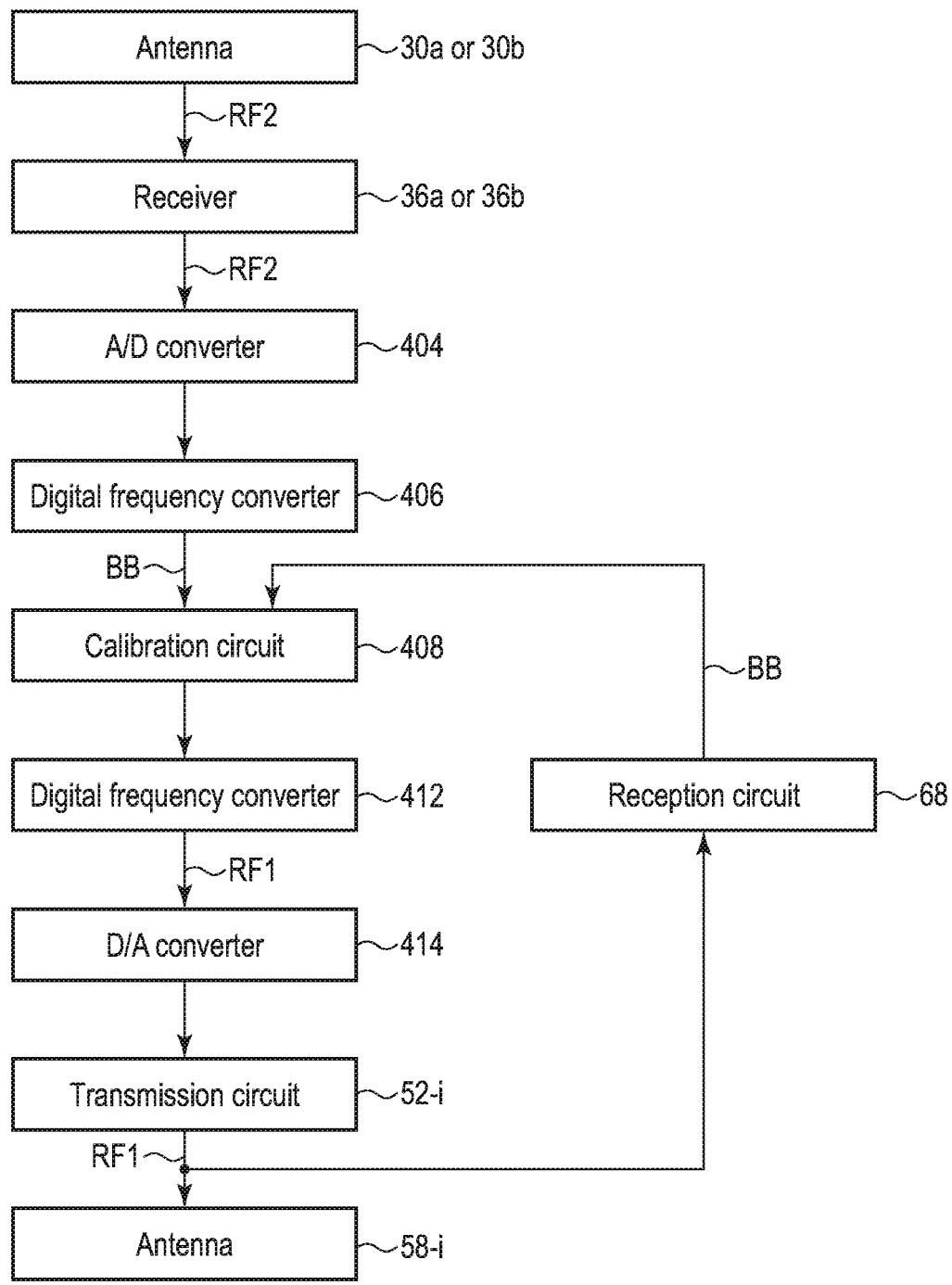
F I G. 18

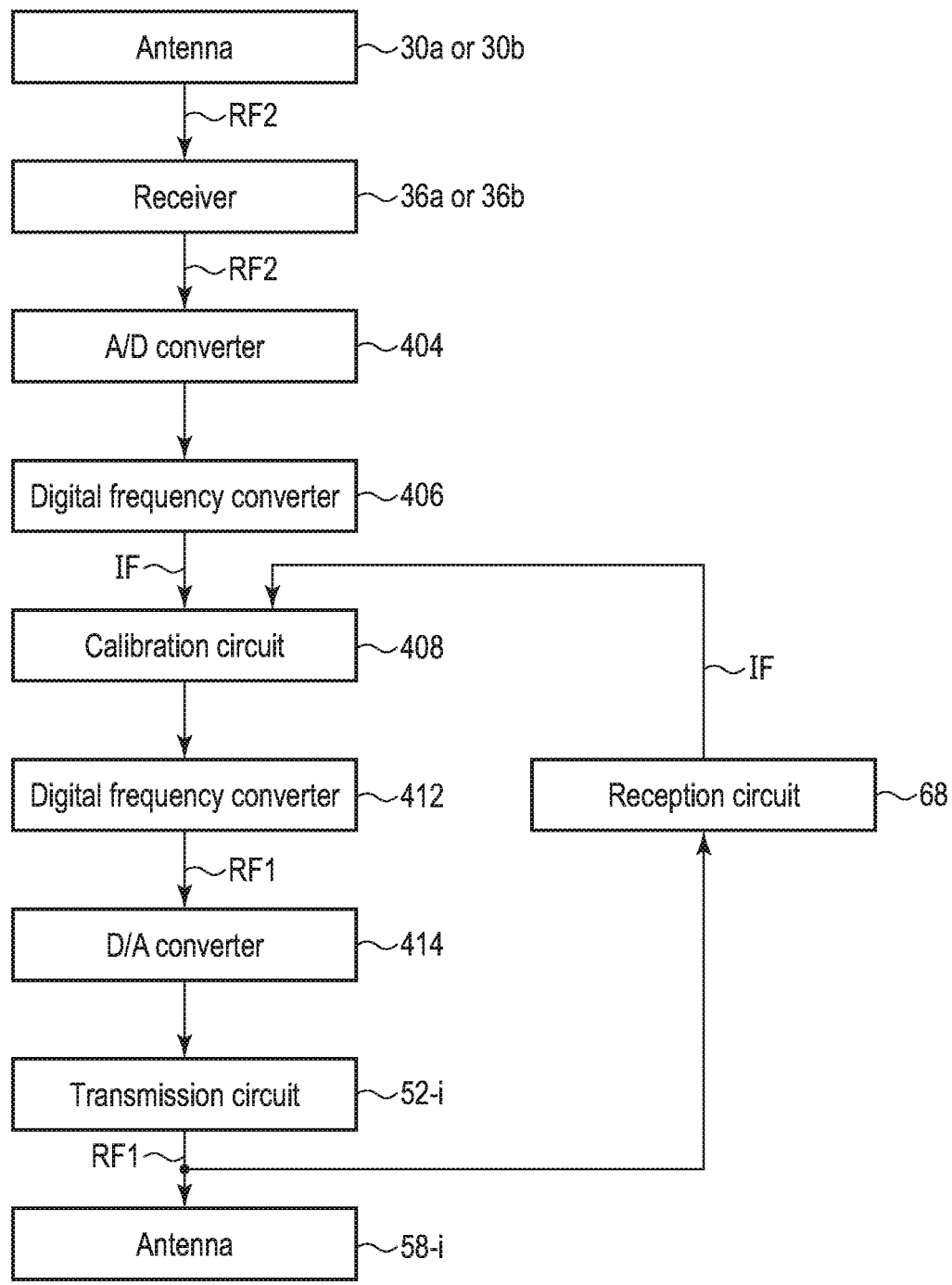
F I G. 19

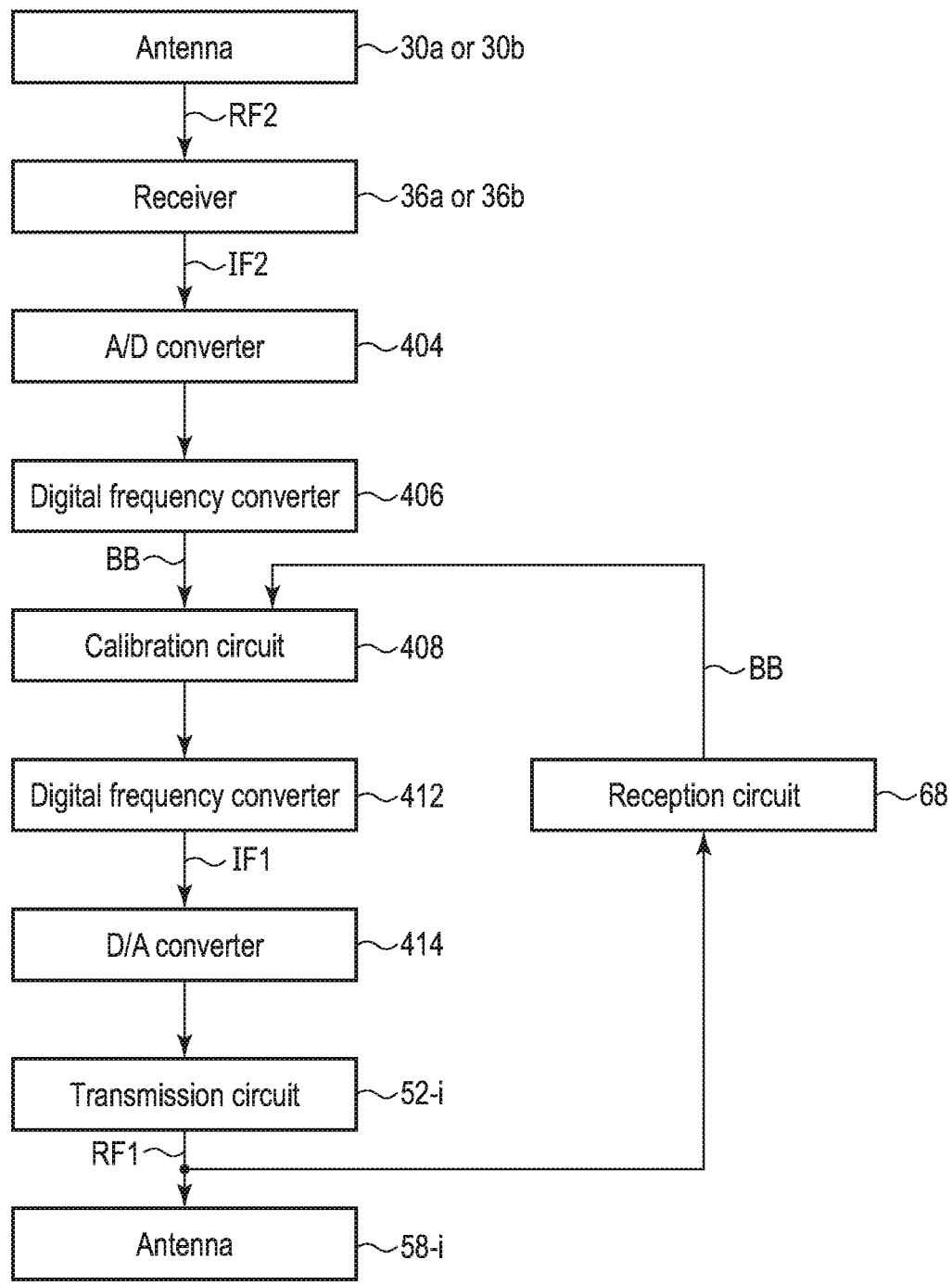
F I G. 20

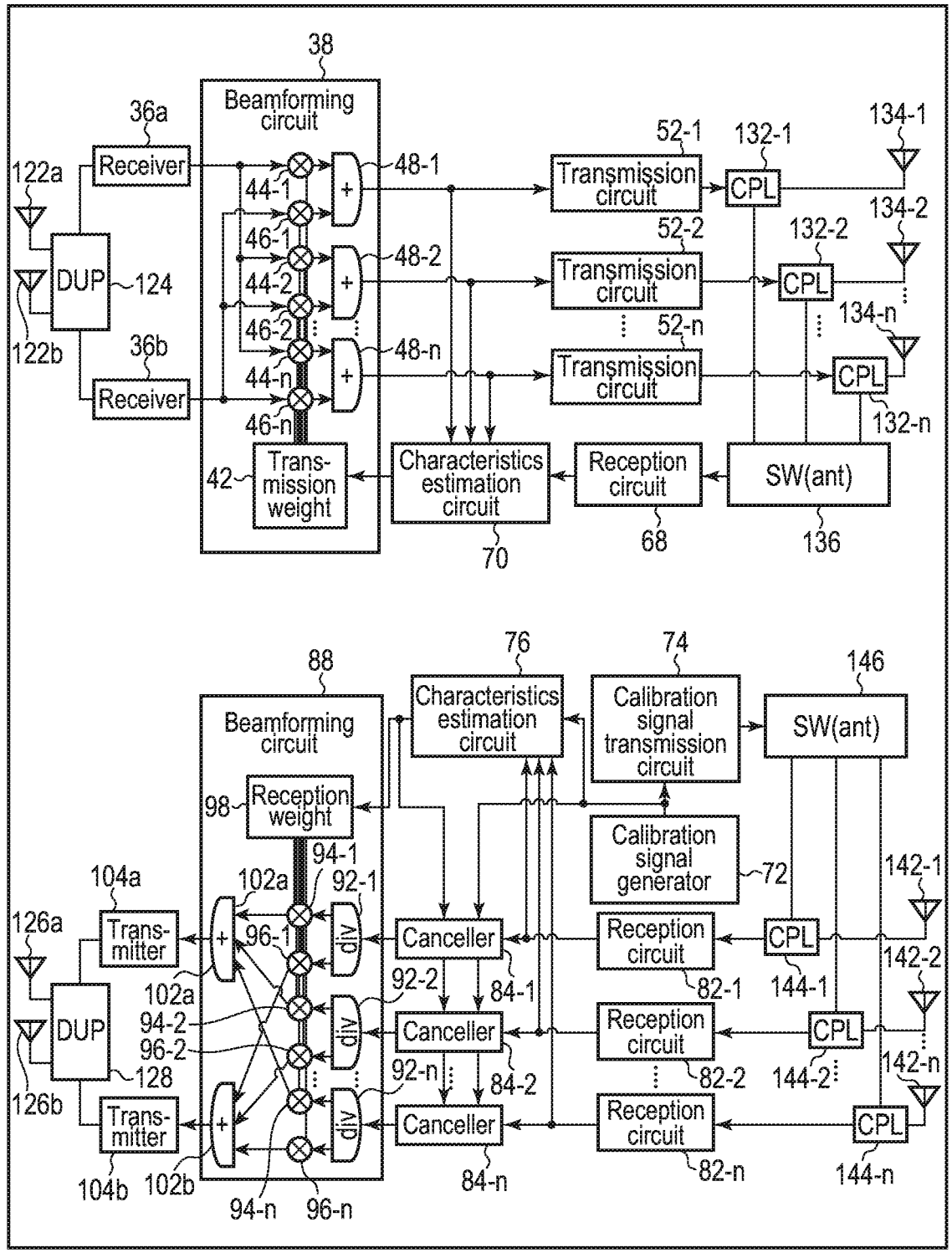
F I G. 23

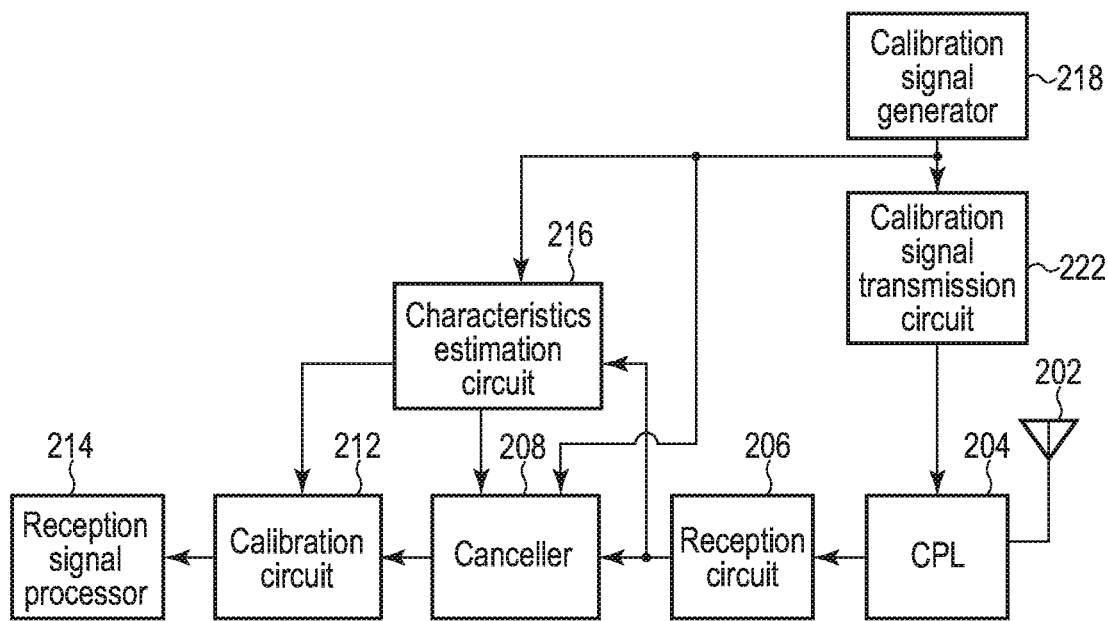
F I G. 26
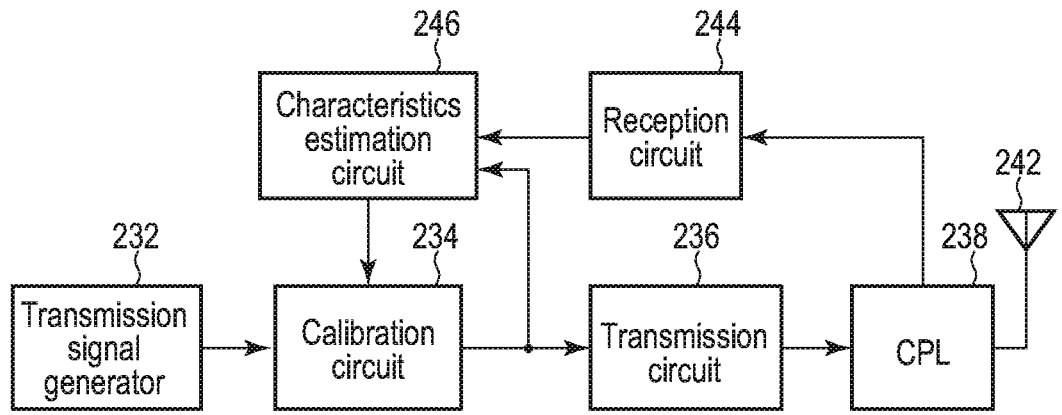
F I G. 27
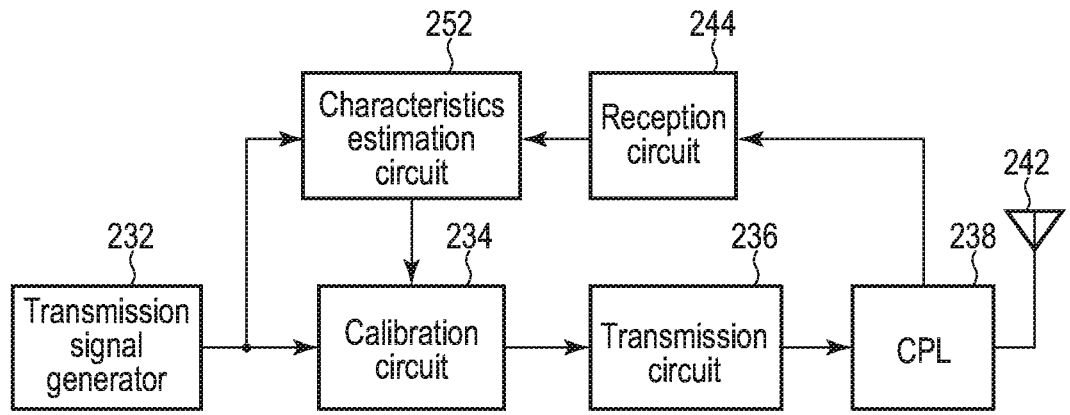
F I G. 28

ELECTRONIC APPARATUS AND METHOD

CROSS-REFERENCE TO RELATED APPLICATIONS

This application is based upon and claims the benefit of priority from Japanese Patent Application No. 2019-235665, filed Dec. 26, 2019, the entire contents of which are incorporated herein by reference.

FIELD

Embodiments described herein relate generally to an electronic apparatus and a method.

BACKGROUND

In a wireless communication system, calibration is performed to compensate for errors or variations in the characteristics of circuit components. For example, it is desired that an amplifier of a transmitter and an amplifier of a receiver amplify input signals without distortion. However, output signals of the amplifiers may be distorted due to variations in the phase and amplitude characteristics of the amplifiers. Therefore, a known calibration signal is input to the transmitter or receiver instead of the transmission signal or the reception signal, a variation in the phase and amplitude characteristics is estimated based on the calibration signal which has been distorted by the transmitter or receiver and the calibration signal which has not been distorted yet, and the phase and the amplitude of the signal are adjusted based on the measured variations to cancel the distortion (this is referred to as calibration).

Calibration is not performed only to compensate for a variation in the phase and amplitude characteristics of a single circuit component, but may also be performed to compensate for relative variations in the phase and amplitude characteristics between a plurality of circuit components. For example, in a beam forming technique which imparts directivity to the beam transmitted to and received from an array antenna including a plurality of antenna elements, variations in the phase and amplitude characteristics between the transmitter and receiver of the antenna elements would be a problem. In an array antenna, as in the case of a single circuit component, relative variations between the transmitters or the receivers are measured using the calibration signal, and the variations are compensated for.

In conventional calibration, the calibration signal is input to the transmitter and receiver. The calibration signal may interfere with the transmission signal and the reception signal.

BRIEF DESCRIPTION OF THE DRAWINGS

FIG. 12 illustrates a block diagram of another example of the part of the electronic apparatus related to the reception calibration of the service link according to the first embodiment.

FIG. 18 illustrates a block diagram of another example of the part of the electronic apparatus related to the transmission calibration of the service link according to the first embodiment.

FIG. 19 illustrates a block diagram of another example of the part of the electronic apparatus related to the transmission calibration of the service link according to the first embodiment.

FIG. 20 illustrates a block diagram of another example of the part of the electronic apparatus related to the transmission calibration of the service link according to the first embodiment.

FIG. 23 illustrates a circuit diagram of an example of an electronic apparatus according to a third embodiment.

FIG. 26 illustrates a circuit diagram of an example of an electronic apparatus according to a fifth embodiment.

FIG. 27 illustrates a circuit diagram of an example of an electronic apparatus according to a sixth embodiment.

FIG. 28 illustrates a circuit diagram of an example of an electronic apparatus according to a seventh embodiment.

DETAILED DESCRIPTION

Figure 1:
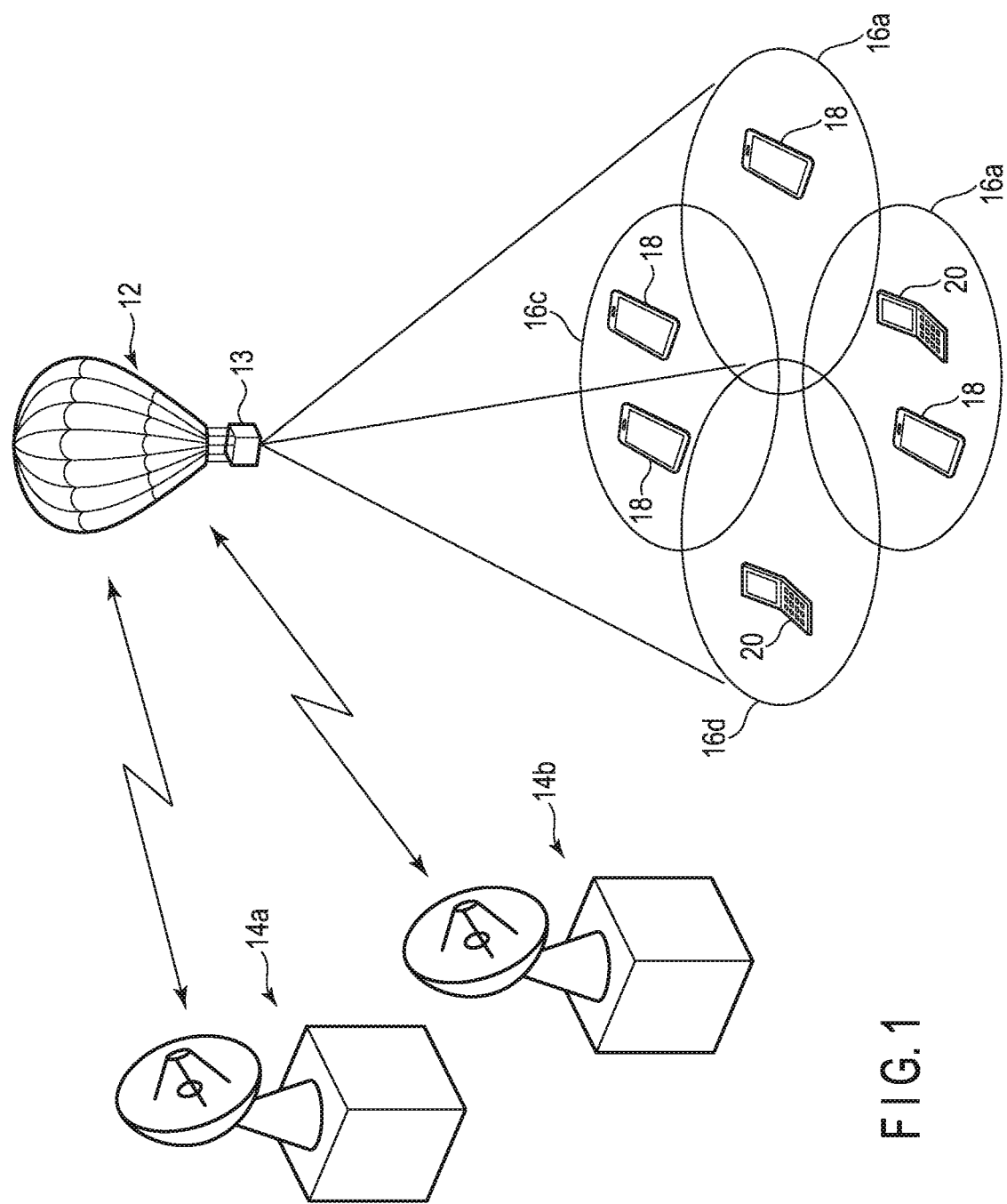
FIG. 1 illustrates an example of a wireless communication system including an electronic apparatus according to a first embodiment.

Embodiments will be described below with reference to the drawings. The following description is an example of an apparatus or method for embodying a technical idea of an embodiment. The technical philosophy of the embodiment is not limited to the structure, shape, arrangement, materials, etc., of the components described below. Variations that are readily apparent to those skilled in the art are naturally included within the scope of the disclosure. For the sake of clarity, the drawings show the size, thickness, flat dimensions or shape of each element as actual The drawings may be modified and schematically represented against the implementation of the In more than one drawing, elements may be included that have different dimensional relationships and proportions to each other. In multiple drawings, corresponding elements may be marked with the same reference numeral to omit duplicate explanations. Some elements may be called by multiple names. Although some elements may be given multiple designations, these designations are for illustrative purposes only. These elements may be called by other names. This does not preclude giving other names to these elements even if they are not given multiple designations. In the following explanation, "connection" means not only direct connection but also connection through other elements.

In general, according to one embodiment, an electronic apparatus includes a receiver and a signal addition circuit. The receiver receives a reception signal of a first frequency band. The signal addition circuit is configured to input the reception signal and a calibration signal of a second frequency band which is different from the first frequency band to the receiver.

First Embodiment

FIG. 1 shows an example of a wireless communication system including an electronic apparatus according to the first embodiment. The example of the electronic apparatus is a relay apparatus 13. The relay apparatus 13 receives a signal transmitted from a first wireless communication apparatus and sends the reception signal to a second wireless communication apparatus. Or conversely, the relay apparatus 13 receives a signal sent from the second wireless communication apparatus and sends the reception signal to the first wireless communication apparatus.

The wireless communication system includes a fixed wireless communication apparatus and a portable wireless communication apparatus. An example of the fixed wireless communication apparatus includes one or more, in the example of FIG. 1, two base station apparatuses 14a and 14b or base stations conforming thereto. The two base station apparatuses 14a and 14b may belong to the same cellular phone company, or different cellular phone companies. The frequency bands of signals sent from and received by the apparatuses 14a and 14b may be the same or different. Furthermore, multiple cellular phone companies may use the same base station apparatus in common. An example of the portable wireless communication apparatus may include a smartphone 18, a cellular phone 20, and the like. The portable wireless communication apparatus, such as the smartphone 18, is capable of communicating with the fixed wireless communication apparatus, such as the base station apparatuses 14a and 14b, etc. If the portable wireless communication apparatus and the fixed wireless communication apparatus cannot communicate directly, the portable wireless communication apparatus and the fixed wireless communication apparatus communicate via the relay apparatus 13.

Both the base station apparatuses 14a and 14b and the relay apparatus 13 may be permanent facilities, but the relay apparatus 13 may be a temporary facility for emergency response. The base station apparatuses 14a and 14b may be installed on the ground, on the roof of a building or building, or on top of a steel tower. In FIG. 1, the relay apparatus 13 is mounted on a balloon 12, but the location of the mount is not limited thereto. The relay apparatus 13 may be placed on a roof of a building, for example, or on a roof of a car, an airplane, an airship, or on a satellite. If there is a failure of the base station apparatus 14a or 14b, or if the number of portable wireless communication apparatuses in a specific area is temporarily increased because of an event, the balloon 12 (or airship or vehicles) is moved to the location of the failed base station apparatus 14a or 14b, or to a specific area.

Wireless communication between the base station apparatuses 14a and 14b and the relay apparatus 13 is referred to as a feeder link. Wireless communication between the relay apparatus 13 and the portable wireless communication apparatuses such as the smartphone 18, cellular phone 20, and the like is referred to as a service link. The frequency bands of the feeder link and the service link of the same cellular phone company may be the same, or different.

The relay apparatus 13 includes an antenna and a wireless communication for the service link apparatus and an antenna and a wireless communication apparatus for the feeder link. The wireless communication apparatus for the service link and the wireless communication apparatus for the feeder link are electrically connected to each other. The signals transmitted from the base station apparatuses 14a and 14b are received by the antenna and the wireless communication apparatus for the feeder link. The reception signals are transmitted to the wireless communication apparatuses such as the smart phone 18, the cellular phone 20, and the like by the wireless communication apparatus and the antenna for the service link. The signals transmitted from the wireless communication apparatuses such as the smart phone 18, the cellular phone 20, and the like are received by the wireless communication apparatus and the antenna for the service link. The reception signals are transmitted to the base station apparatuses 14a and 14b by the antenna and the wireless communication apparatus for the feeder link.

The wireless communication system of the feeder link and the wireless communication system of the service link may be the same or different. The frequency bands of the feeder link and the service link may be the same or different. For example, the radio waves of the feeder link and the service link may include radio waves with a wavelength ranging from 1 to 30 millimeters. The radio waves with a wavelength ranging from 1 to 10 millimeters may be referred to as extremely high frequency waves or millimeter waves, and the radio waves with a wavelength ranging from 1.0 to 150 millimeters may be referred to as super high frequency waves or microwaves.

The relay apparatus 13 performs beamforming to form a plurality of, that is, in the example of FIG. 1, four cells 16a, 16b, 16c, and 16d for a portable wireless communication apparatus, and forms a plurality of beam patterns oriented to the ground. In the example in FIG. 1, the number of cells is 4. However, the number of cells and the size of the cells can be freely determined based on the required communication area, communication quality, communication capacity, etc. Multiple cells can be cells of the same cellular phone company or cells of different cellular phone companies. The relay apparatus 13 may perform beamforming for the base station apparatuses 14a and 14b.

[Relay Apparatus]

Figure 2:
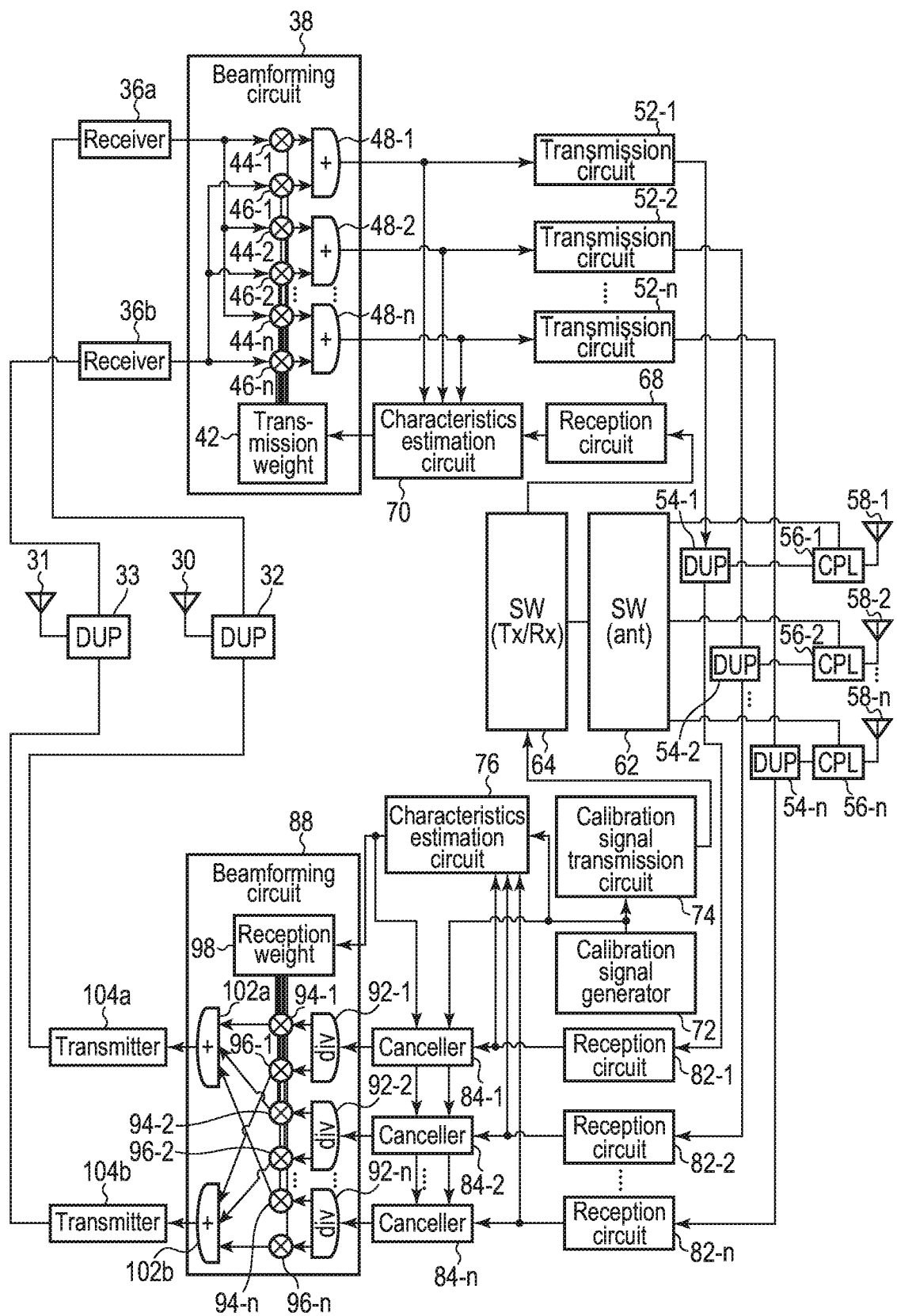
FIG. 2 illustrates a block diagram of an example of the electronic apparatus according to the first embodiment.

FIG. 2 is a block diagram showing an example of the relay apparatus 13. The relay apparatus 13 includes feeder link antennas 30 and 31, feeder link receivers 36a, 36b, and feeder link transmitters 104a and 104b. The antennas 30 and 31 are antennas for both transmission and reception, but antennas for transmission and antennas for reception may be provided separately. Each of the antennas 30 and 31 is an array antenna including a plurality of antenna elements.

The relay apparatus 13 includes service link antennas 58-1, 58-2, . . . 58-n, a service link transmitter, and a service link receiver, where n is an arbitrary integer of two or more. The antennas 58-1 to 58-n are antennas that can be used for both transmission and reception, but antennas for transmission and antennas for reception may be provided separately. The service link transmitter includes a beamforming circuit 38, transmission circuits 52-1, 52-2, . . . 52-n, a reception circuit 68, and a characteristics estimation circuit 70. The service link receiver includes a calibration signal generator 72, a calibration signal transmission circuit 74, reception circuits 82-1, 82-2, . . . 82-n, cancellers 84-1, 84-2, . . . 84-n, a beamforming circuit 88, and a characteristics estimation circuit 76.

The antenna 30 is connected to the receiver 36a and the transmitter 104a via a duplexer (DUP) 32. The antenna 31 is connected to the receiver 36b and the transmitter 104b via a duplexer (DUP) 33.

In FIG. 2, the beams emitted from the antennas 30 and 31 are to form cells, respectively. Two cells can be cells for different cellular phone companies, or different cells for the same cellular phone company. The output signal of the receiver 36a for the first cell is input to a plurality of multipliers 44-1, 44-2, . . . 44-n. The multipliers 44-1, 44-2, . . . 44-n multiply the output signal of the receiver 36a with transmission weights (each including the phase shift amount and amplification factor) set by a transmission weight circuit 42. The phase and the amplitude of the output signal of the receiver 36a are adjusted by the multipliers 44-1, 44-2, . . . 44-n. The adjusted signals are supplied to the antennas 58-1, 58-2, . . . 58-n. A beam emitted from the antennas 58-1 to 58-n is directed to conform to a first one of the cells 16a to 16d. The output signal of the receiver 36b for the second cell is input to a plurality of multipliers 46-1, 46-2, . . . 46-n. The multipliers 46-1, 46-2, . . . 46-n multiply the output signal of the receiver 36b with transmission weights (each including the phase shift amount and amplification factor) set by the transmission weight circuit 42. The phase and the amplitude of the output signal of the receiver 36b are adjusted by the multipliers 46-1, 46-2, . . . 46-n. The adjusted signals are supplied to the antennas 58-1, 58-2, . . . 58-n. A beam emitted from the antennas 58-1 to 58-n is directed to conform to a second one of the cells 16a to 16d. The frequencies of each part of FIG. 2 (radio frequency (RF), intermediate frequency (IF), baseband frequency (BB) will be discussed below with reference to FIGS. 8 and 9.

The output signals of the multipliers 44-1, 44-2, . . . 44-n and the output signals of the multipliers 46-1, 46-2, . . . 46-n are added by adders 48-1, 48-2, . . . 48-n. The multipliers 44-1 to 44-n, 46-1 to 44-n, the adders 48-1 to 48-n, and the transmission weight circuit 42 form the beamforming circuit 38. The output signals of the adders 48-1 to 48-n are input to the characteristics estimation circuit 70, and to the transmission circuits 52-1, 52-2, . . . 52-n, respectively. The transmission circuits 52-1, 52-2, . . . 52-n perform transmission process of the outputs of the beamforming circuit 38 and generate transmission signals in the RF band.

The transmission signals are supplied to the antennas 58-1, 58-2, . . . 58-n through duplexers (DUP) 54-1, 54-2, . . . 54-n and couplers (CPL) 56-1, 56-2, . . . 56-n. Then, the transmission signals are radiated from the antennas 58-1 to 58-n. The transmission signals are also input to the reception circuit 68 through the duplexers 54-1, 54-2, . . . 54-n, the couplers 56-1, 56-2, . . . 56-n, an antenna switch (ant SW) 62, and a transmission/reception switch (Tx/Rx SW) 64. The antenna switch 62 selects one of the signals from the couplers 56-1, 56-2, . . . 56-n.

Reception signals from the antennas 58-1, 58-2, . . . 58-n are supplied to the reception circuits 82-1, 82-2, . . . 82-n through the couplers 56-1, 56-2, . . . 56-n and the duplexers 54-1, 54-2, . . . 54-n.

The reception circuit 68 performs reception process of the input signal in the RF band and converts the input signal into a signal in a band lower than the RF band. The output signal of the reception circuit 68 is input to the characteristics estimation circuit 70. The characteristics estimation circuit 70 compares the phases and amplitudes of the input signals of the transmission circuits 52-1 to 52-n and the phases and amplitudes of the input signals after the transmission process and the reception process through the transmission circuits 52-1 to 52-n and the reception circuit 68. Then, the characteristics estimation circuit 70 estimates a variation in the composite characteristics of the phase and amplitude characteristics of the transmission circuits 52-1 to 52-n and the phase and amplitude characteristics of the reception circuit 68 based on the comparison result. Since the phase and amplitude characteristics of the reception circuit 68 affect the phase and amplitude characteristics of the transmission circuits 52-1 to 52-n, the characteristics estimation circuit 70 estimates the variation in the phase and amplitude characteristics between the transmission circuits 52-1 to 52-n. Thus, the characteristics estimation circuit 70 does not use the calibration signal, but only the transmission signal to estimate the variation in the phase and amplitude characteristics of the transmission circuits 52-1 to 52-n, and the variation can be estimated without interference from the calibration signal. The estimation result is input to the transmission weight circuit 42.

The variation can be estimated based on the transmission signal at a certain timing only, but the accuracy of the estimation result can be improved by using multiple estimation results comprehensively. For example, the estimation results may be obtained at regular intervals and averaged. However, compared to the estimation result at a certain timing, past estimation results are more likely to exert lower accuracy to the estimation result at the certain timing. Therefore, smaller weights are put on the estimation results in the past while larger weights are put on the estimation results closer to the present, and multiple estimation results may be weighted and averaged.

In the estimation based on the transmission signal, when the power of the transmission signal is low, the effect of noise is significant, and the accuracy of the estimation result may be lowered.

Thus, in some cases, a smaller weight is applied to the estimation result when the power of the transmission signal is low and a larger weight is applied to the estimation result when the power of the transmission signal is high, and the estimation results are averaged to achieve better estimation accuracy. Thus, the characteristics estimation circuit 70 performs estimation using weighted estimation results of a predetermined number for a certain period of time, weighted according to the transmission power. Another example of weights is a first weight used if the transmission power is above a threshold, and a second weight used if it is below the threshold, where the second weight has a smaller value than the first weight. In setting these weights, the time since the present may also be considered. That is, the current estimation result is multiplied by the largest weight, and for the past estimation results, may be multiplied by a weight that becomes smaller as the estimation time is older.

Another example of estimation is to use an IIR filter. For example, the estimation values are obtained at regular intervals, and from the estimation value E_k estimated at the kth period, the post-processing estimation value E_iir_k, calculated by the IIR filter, is expressed as follows $$E\_iir\_k = (1-\alpha) \times E\_iir\_k-1 + \alpha \times E\_k \quad \text{Equation 1}$$

α is a weight to be multiplied to the newly estimation value. If the transmission power is greater than or equal to the threshold, α is the first value, and if it is less than the reference value, it is less than the first value, which is the second value. For example, α may be a value obtained by dividing the transmission power by an α calculation reference power which is set to be greater than an assumed maximum power. When the transmission power increases, the value of α becomes greater, and when the transmission power is less than the threshold, the value of α becomes smaller.

In addition, when a difference of the transmission power between the lower half and the upper half in the frequency band of the transmission signal becomes greater than a certain threshold, the weight may be reduced. Thus, in a case where the variation in the transmission power in each frequency band becomes great, decrease of the estimation accuracy can be avoided even if there is enough transmission power.

In addition, when the transmission power becomes above the threshold after the transmission power is below the threshold for a certain period of time or more, the estimated values in the state where the transmission power is below the threshold may be discarded once. This is because, in a case where the estimation of lower accuracy is continued for a certain period of time or more, the estimation accuracy may become higher by using newly highly accuracy estimation value instead of averaging those values with weights.

Based on the results of the estimation of the characteristics estimation circuit 70, the transmission weight circuit 42 sets the transmission weight of the multipliers 44-1 to 44-n to correct in advance variations in the phase and amplitude characteristics of the output signals of 52-1 to 52-n. For example, if the phase of a certain transmission circuit 52 is shifted by +A degrees, a weight to rotate the phase of the signal input to the certain transmission circuit 52 by −A degrees. If the amplitude of an input signal to a certain transmission circuit 52 is different by a factor of B fold, a weight to multiply the amplitude of the signal input to the transmission circuit 52 by (1/B) fold. Thus, the transmission calibration by which the phase and amplitude characteristics of all the transmission circuits 52-1 to 52-n are aligned with the desired phase and amplitude characteristics is performed. The characteristics estimation circuit 70 and the beamforming circuit 38 form the transmission calibration circuit.

The calibration signal generator 72 generates a calibration signal in a frequency band different from the frequency band of the reception signal. The calibration signal is input to the characteristics estimation circuit 76 and the calibration signal transmission circuit 74. The calibration signal transmission circuit 74 performs the transmission process of the input signal and converts the input signal to a calibration signal of the RF band. The output signal of the calibration signal transmission circuit 74 is added to the reception signals of the antennas 58-1 to 53-n in the couplers 56-1 to 56-n through the transmission/reception switch 64 and the antenna switch 62.

The output signals of the reception circuits 82-1, 82-2, . . . 82-n are input to the characteristics estimation circuit 76, and are input to cancellers 84-1, 84-2, . . . 84-n, respectively.

The characteristics estimation circuit 76 compares the phase and amplitude of the calibration signal output from the calibration signal generator 72 and the phases and amplitudes of the signals after the transmission process and the reception process through the reception circuits 82-1 to 82-n and the calibration signal transmission circuit 74. Then, the characteristics estimation circuit 76 estimates variations in the composite characteristics of the phase and amplitude characteristics of the reception circuits 82-1 to 82-n and the phase and amplitude characteristics of the calibration signal transmission circuit 74 based on the comparison result. Since the phase and amplitude characteristics of the calibration signal transmission circuit 74 affect the phase and amplitude characteristics of the reception circuits 82-1 to 82-n, the characteristics estimation circuit 76 estimates the variations in the phase and amplitude characteristics between the reception circuits 82-1 to 82-n. Note that the reception signals from the antennas 58-1 to 58-n may be mixed to the calibration signal. However, since both signals have different frequency bands, the estimation accuracy can further be improved when only the calibration signal is extracted from the outputs of the reception circuits 82-1 to 82-n using a filter.

As described above, the characteristics estimation circuit 76 estimates the variations in the phase and amplitude characteristics of the reception circuits 82-1 to 82-n by using the calibration signal of the frequency band which is different from the frequency band of the reception signal. Thus, the variations are estimated without being interfered from the calibration signal, even during reception. A typical wireless communication apparatus can control the timing of transmission and reception, and thus, calibration can be carried out by mixing the calibration signal with the transmission signal and the reception signal within a period where the transmission and reception operation is not performed. However, a relay apparatus that relays signals from other wireless communication apparatus cannot control the timing of transmission and reception, and a period in which the transmission/reception operations not performed cannot be predetermined. Thus, the calibration signal and the transmission/reception signal may be mixed.

However, according to an embodiment, calibration signals of a frequency band different from the frequency band of the reception signal is mixed in the reception signal, and thus, even in a relay apparatus that relays signals from other wireless communication apparatuses, the variations can be estimated. Estimation results are supplied to the reception weight circuit 98 and the cancellers 84-1 to 84-n.

The cancellers 84-1 to 84-n receive the output signals of the calibration signal generator 72 and the characteristics estimation circuit 76. The cancellers 84-1 to 84-n cancel the calibration signal from the outputs of the reception circuits 82-1 to 82-*n*. Only the reception signals from the antennas 58-1 to 58-*n* are transmitted to the beamforming circuit 88 and input to dividers 92-1, 92-2, . . . 92-*n* to be bifurcated. The term bifurcation here means that two signals identical to the input signal are generated. The cancellers 84-1 to 84-*n* use a filter to cancel the frequency band of the calibration signal. The filter may be a digital filter or an analog filter.

The first output signals of the distributors 92-1, 92-2, . . . 92-*n* are multiplied by, in the multipliers 94-1, 94-2, . . . 94-*n*, the reception weights (including the amount of phase shift and amplification factor) set by the reception weight circuit 98 in order to adjust the phase and amplitude characteristics.

Directionality is given to the first output signals of the distributors 92-1, 92-2, . . . 92-*n* such that the beam entering the antennas 58-1 to 58-*n* correspond to any one of the cells 16*a* to 16*d*. The second output signals of the distributors 92-1, 92-2, . . . 92-*n* are multiplied by the reception weights set by the reception weight circuit 98 in order to adjust the phase and amplitude characteristics. Directionality is given such that the beam entering the antennas 58-1 to 58-*n* correspond to any one of the cells 16*a* to 16*d*.

The output signals of multipliers 94-1 to 94-*n* are added by an adder 102*a*. The output signals of multipliers 96-1 to 96-*n* are added by an adder 102*b*. The distributors 92-1 to 92-*n*, the multipliers 94-1 to 94-*n*, 96-1 to 96-*n*, the adders 102*a* and 102*b*, and the reception weight circuit 98 form the beamforming circuit 88. The characteristics estimation circuit 76, beamforming circuit 88, and the cancellers 84-1 to 84-*n* form a reception calibration circuit.

The output signals of the adders 102*a* and 102*b* are supplied to the transmitter 104*a* for the first cell and the transmitter 104*b* for the second cell.

Figure 3:
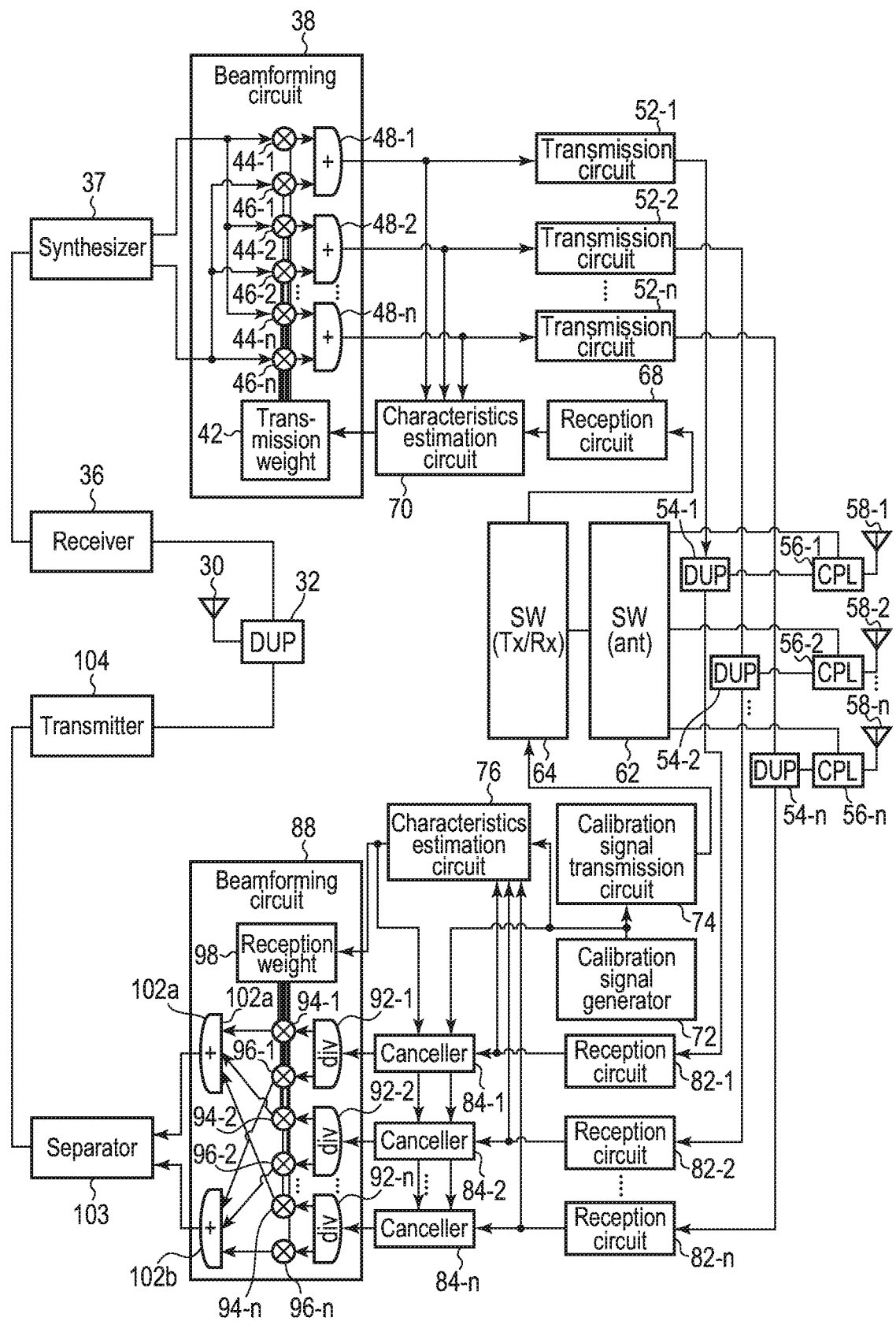
FIG. 3 illustrates a block diagram of another example of the electronic apparatus according to the first embodiment.

FIG. 3 is a circuit diagram of another example of the relay apparatus 13. In FIG. 2, the antenna 30, the receiver 36*a*, and the transmitter 104*a* for the first cell, and the antennas 31, the receivers 36*b*, and the transmitters 104*b* for the second cell are provided separately. FIG. 3 shows the antenna 30, the receiver 36, and the transmitter 104 are common for the first cell and the second cell. Therefore, the output of the receiver 36 is supplied through a synthesizer 37 to the beamforming circuit 38 as the outputs of the receivers 36*a* and 36*b* of FIG. 2. The first and second outputs of the beamforming circuit 88 are supplied to the transmitter 104 via a separator 103.

[Frequency Band of Calibration Signal]

FIGS. 4 to 7 show examples of frequency bands of the calibration signal and the reception signal when the calibration signal is added to the reception signal by the coupler 56-*i* (i=a positive integer of 1 to n).

Figure 4:
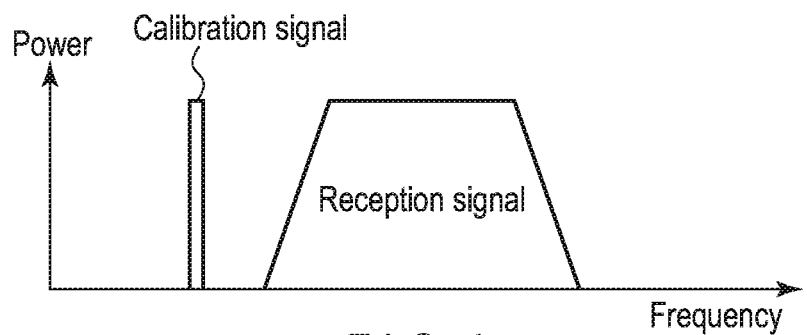
FIG. 4 illustrates an example of a calibration signal according to the first embodiment.

FIG. 4 shows an example where the frequency band of the calibration signal is set lower than the frequency band of the reception signal. The power of the two signals may be equal or different. The calibration signal is a continuous wave (CW) signal or a part of the CW signal. That is, the calibration signal may be the sum of a plurality of CW signals of different frequencies or a part of the sum. The frequency band of the calibration signal in the RF band may be a frequency band of a signal that can be received and processed by the reception circuit 82-*i*, preferably.

Figure 5:
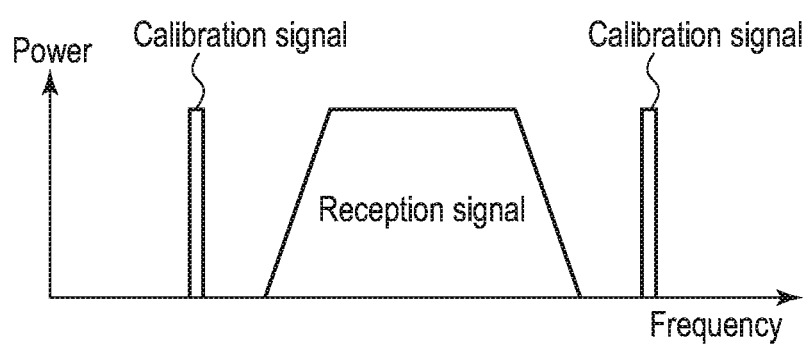
FIG. 5 illustrates another example of the calibration signal according to the first embodiment.

FIG. 5 shows an example of a calibration signal having multiple, e.g., two frequency bands. In general, the phase and amplitude characteristics are slightly different for each frequency. Therefore, if the calibration signal is with only a certain frequency band, the calibration accuracy of other than the certain frequency band is degraded. To avoid this, when using the calibration signal with multiple frequency bands, the frequency bands of the calibration signal should be widely scattered. For example, as shown in FIG. 5, the highest frequency of the lowest frequency band of the calibration signal may be set lower than the lowest frequency of the frequency band of the reception signal. The lowest frequency of the highest frequency band of the calibration signal may be set higher than the highest frequency of the frequency band of the reception signal.

In addition, in order to perform the characteristics estimation using the calibration signal, if the center of gravity in the frequency direction c the calibration signal is significantly different from the center of gravity of the reception signal, the difference will degrade the estimation accuracy. The center of gravity in this case is an averaged value of the calibration signal at frequencies when the weighted average of the calibration signal is calculated using a weight proportional to the power of the calibration signal. In the example of FIG. 5, the center of gravity in the frequency direction of the calibration signal is included in the frequency band of the reception signal. Therefore, the estimation accuracy does not deteriorate. Furthermore, in the example of FIG. 5, even if a signal other than the reception signal, e.g., a signal from the smartphone 18 or the cellular phone 20, is interfere with the calibration signal in one frequency band, the calibration can be performed based on the calibration signal in the other frequency band that is not interfered with.

Figure 6:
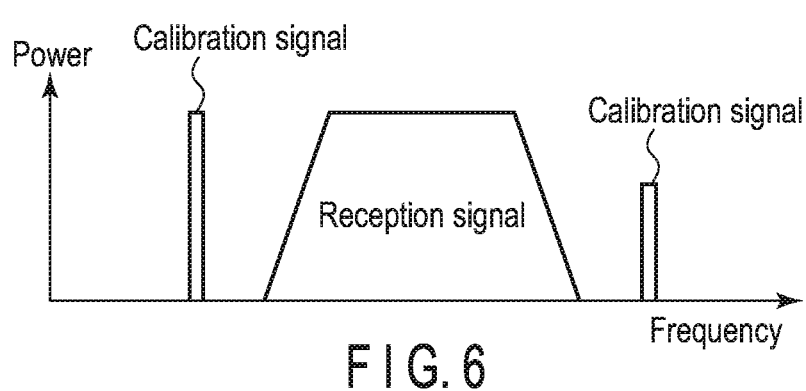
FIG. 6 illustrates another example of the calibration signal according to the first embodiment.

FIG. 6 is a variant of FIG. 5. FIG. 6 shows an example in which, when the calibration signal has multiple frequency bands, the power of the calibration signal in a frequency band which is higher than that of the reception signal is smaller than the power of the calibration signal in the frequency band which is lower than that of the reception signal. Note that, in contrast to of FIG. 6, the power of the calibration signal in the frequency band which is higher than that of the reception signal may be greater than the power of the calibration signal in the frequency band which is lower than that of the reception signal.

Figure 7:
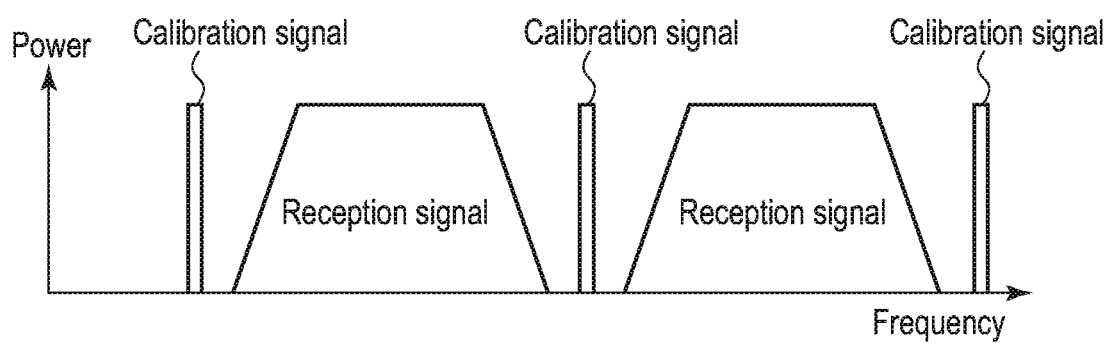
FIG. 7 illustrates another example of the calibration signal according to the first embodiment.

FIG. 7 shows an example of a case where the frequency band of the reception signal is divided into multiple frequency bands. The calibration signal may be placed between two adjacent frequency bands of the reception signal. In that case, the frequency bands of the calibration signal can be more dispersed so that the accuracy of calibration estimation can be increased even when interference other than a radio frequency signal occurs.

[Service Link Reception Calibration]

Figure 8:
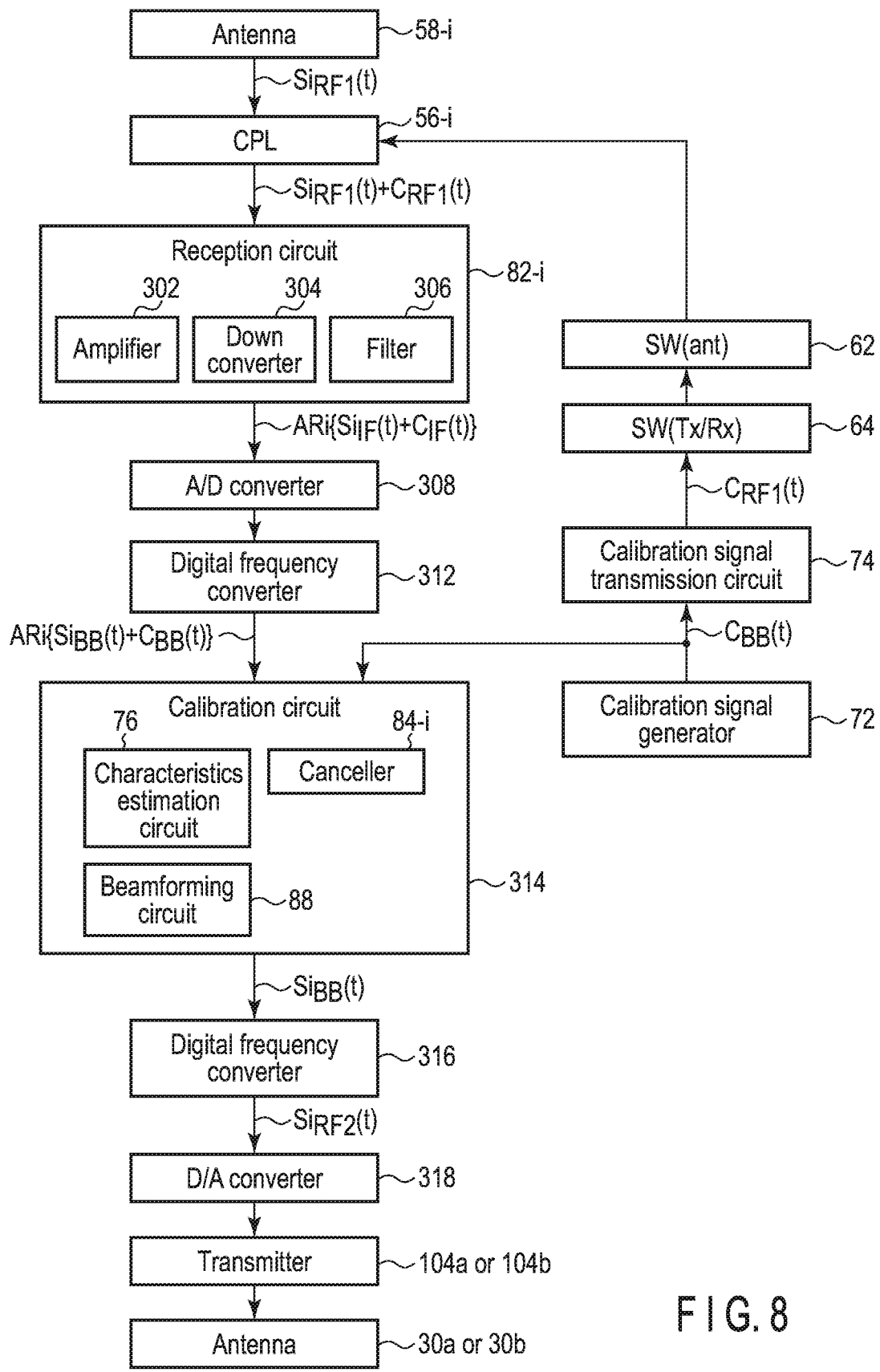
FIG. 8 illustrates a block diagram of an example of a part of the electronic apparatus related to reception calibration of a service link according to the first embodiment.

FIG. 8 is a detailed block diagram of the portion of FIG. 2 relating to the reception calibration of the service link. The calibration signal generator 72 generates a calibration signal $C_{BB}(t)$ of the baseband frequency band (BB band). The calibration signal transmission circuit 74 up-converts the calibration signal $C_{BB}(t)$ in the BB band, and generates calibration signal $C_{RF1}(t)$ in the first radio frequency band (RF1 band).

The calibration signal $C_{RF1}(t)$ is input to the coupler 56-*i* through the transmission/reception switch 64 and the antenna switch 62 and is added to the reception signal $Si_{RF1}(t)$ of the RF1 band output from the antenna 58-*i* for the service link in the coupler 56-1. The frequency band of the calibration signal $C_{BB}(t)$ is set such that when the calibration signal $C_{RF1}(t)$ is added to the reception signal $Si_{RF1}(t)$ at the coupler 56-*i*, the frequency bands of both signals are different from each other.

The sum signal $Si_{RF1}(t)+C_{RF1}(t)$, which is the result of addition by the coupler 56-*i*, is input to the reception circuit 82-*i*. The reception circuit 82-*i* amplifies the sum signal $S_{RF1}(t)+C_{RF1}(t)$, down-converts the amplified signal, filters the down-converted signal, and outputs the filtered sum signal $ARi \times \{Si_{IF}(t)+C_{IF}(t)\}$ in the intermediate frequency (IE) band (IF band). The IF band is lower than the RF1 band and higher than the BB band. The reception circuit 82-$i$ includes an amplifier 302, a down converter 304, a filter 306, etc. ARi are the phase and amplitude characteristics of the reception circuit 82-$i$, where $ARi=ARi_{real}+j \times ARi_{imag}$.

An A/D converter 308 converts the output of the reception circuit 32-$i$ into a digital signal. A digital frequency converter 312 down-converts the output digital signal of the A/D converter 308 into a digital signal in the BB band. The output $ARi\{Si_{BB}(t)+C_{BB}(t)\}$ of the digital frequency converter 312 and the calibration signal $C_{BB}(t)$ of the BB band are input to a calibration circuit 314.

The calibration circuit 314 estimates the variation in the phase and amplitude characteristics ARi of the reception circuit. 82-$i$, adjusts the reception weight of the beamforming circuit 88 according to the estimated variation, and outputs the reception signal $Si_{BB}(t)$ with no variation in the phase and amplitude characteristics.

First, the characteristics estimation circuit 76 multiplies the reception signal $ARi\{Si_{BB}(t)+C_{BB}(t)\}$ by $C_{BB}(t)^*/|C_{BB}(t)|^2$.

$$ARi\{Si_{BB}(t)+C_{BB}(t)\} \times \{C_{BB}(t)^*/|C_{BB}(t)^2|\} = \{ARi \times Si_{BB}(t) \times C_{BB}(t)^*/|C_{BB}(t)^2|\} + ARi \qquad \text{Equation 2}$$

The first term on the right-hand side of equation 2 contains the reception signal, so as time passes, the average value thereof is reduced to zero and the right-hand side becomes ARi. Therefore, the characteristics estimation circuit 76 estimates the variation in the phase and amplitude characteristics ARi of the reception circuit 82-$i$. Since the frequency bands of the reception signal and the calibration signal are different, when the characteristics estimation circuit 76 performs a filter process to reduce the reception signal, the first term of the right-hand side of equation 2 is set to 0 without averaging.

Next, the canceller 84-$i$ cancels a calibration signal component $ARi \times C_{BB}(t)$ from $ARi\{Si_{BB}(t)+C_{BB}(t)\}$ and supplies the reception signal $ARi \times Si_{BB}(t)$ to the beamforming circuit 88.

The beamforming circuit 88 multiplies the reception signal $ARi \times Si_{BB}(t)$ by the $ARi^*/|ARi|^2$.

$$ARi \times Si_{BB}(t) \times ARi^*/|ARi|^2 = Si_{BB}(t) \qquad \text{Equation 3}$$

As shown in Equation 3, the beamforming circuit 88 can derive the reception signal $Si_{BB}(t)$, which is not affected by the variation in the phase and frequency characteristics ARi of the reception circuit 82-$i$.

A digital frequency converter 316 up-converts the reception signal $Si_{BB}(t)$ output from the calibration circuit 314 into a signal $Si_{RF2}(t)$ of the second radio frequency band (RF2 band). The RF1 band and the RF2 ban may be the same.

An D/A converter 318 converts the output $Si_{RF2}(t)$ of the digital frequency converter 316 to an analog signal. The analog signal is input to the transmitter 104$a$ or 104$b$ for the feeder link. The transmitter 104$a$ or 104$b$ does not up-convert the input signal, but amplifies and filters the input signal to be output. The output signal of the transmitter 104$a$ or 104$b$ is input to the antenna 30$a$ or 30$b$ for the feeder link. Thus, the relay apparatus 13 transmits the signal received by the antenna 58-$i$ of the service link from the antenna 30$a$ or 30$b$ of the feeder link.

When the feeder link also uses beamforming, the receiver 36$a$ and 36$b$ for the feeder link are configured in the same way as in FIG. 8.

[Service Link Transmission Calibration]

Figure 9:
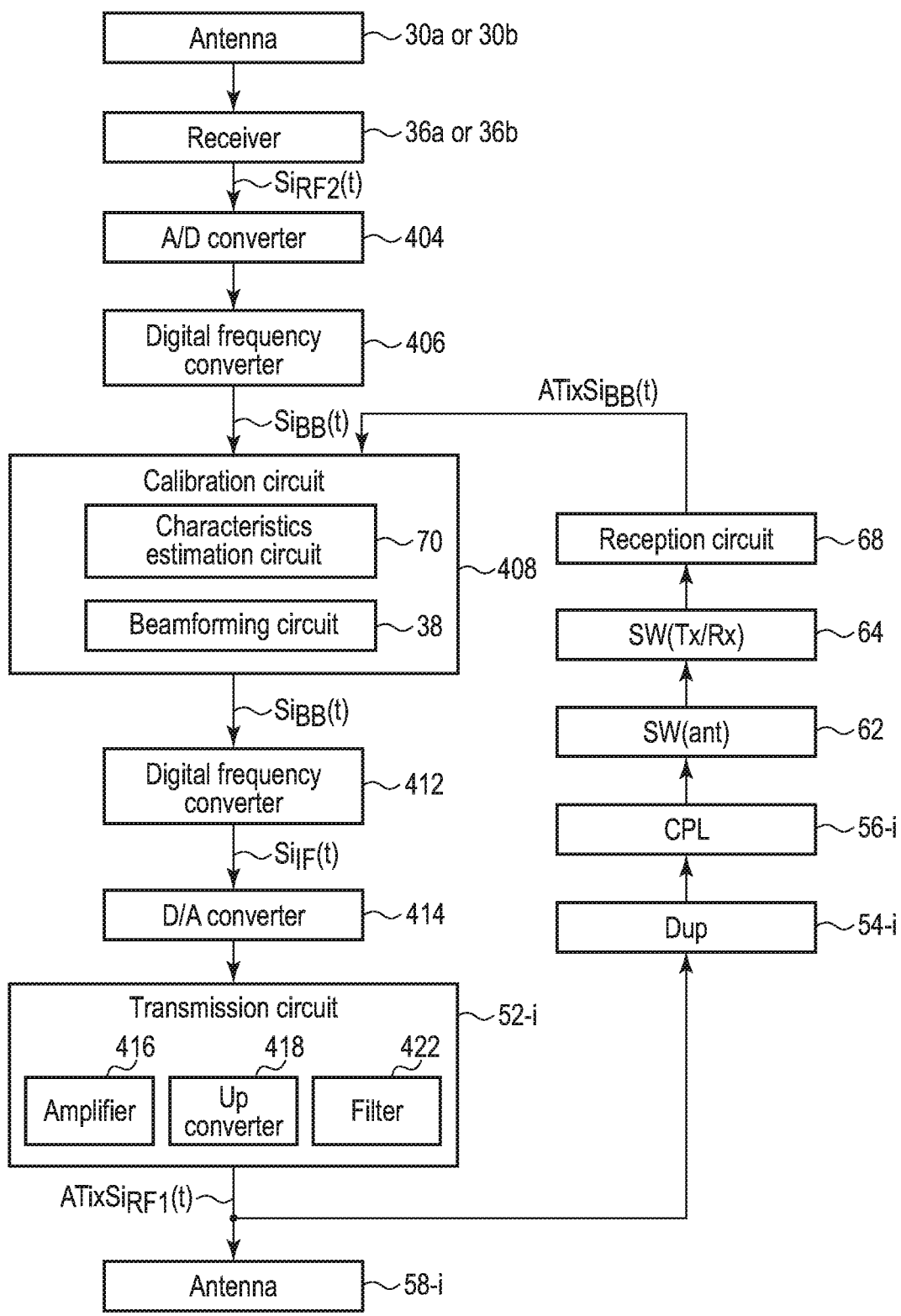
FIG. 9 illustrates a block diagram of a part of the electronic apparatus related to transmission calibration of the service link according to the first embodiment.

FIG. 9 is a detailed block diagram of the portion related to the transmission calibration of the service link in FIG. 2. The reception the RF2 band signal output from the antenna 30$a$ or 30$b$ for the feeder link is input to the receiver 36$a$ or 36$b$. The receiver 36$a$ or 36$b$ does not down-convert the output signal, but amplifies and filters the input signal to be output. An A/D converter 404 converts the output signal $Si_{RF2}(t)$ of the receiver 36$a$ or 36$b$ to a digital signal. An digital frequency converter 406 down-converts the output digital signal of the A/D converter 404 into a BB band signal $Si_{BB}(t)$. The output $Si_{BB}(t)$ of the digital frequency converter 406 and the output $ATi \times Si_{BB}(t)$ of the reception circuit 68 are input to a calibration circuit 408, where ATi is the phase and amplitude characteristics of the transmission circuit 52-$i$, and $ATi=ATi_{real}+j \times ATi_{imag}$.

The calibration circuit 408 estimates the variation in the phase and amplitude characteristics ATi of the transmission circuit 52-$i$, and adjusts the transmission weight of the beamforming circuit 38 according to the estimated variation, and outputs the transmission signal $Si_{BB}(t)$ with no variation in the phase and amplitude characteristics.

First, the characteristics estimation circuit 70 multiplies $AT \times Si_{BB}(t)$ by $Si_{BB}(t)^*/|Si_{BB}(t)^2|$.

$$ATi \times Si_{BB}(t) \times Si_{BB}(t)^*/|Si_{BB}(t)^2| = ATi \qquad \text{Equation 4}$$

The characteristics estimation circuit 70 can estimate the phase and amplitude characteristics ATi of the transmission circuit 52-$i$ as in Equation 4.

Next, the beamforming circuit 38 multiplies the transmission signal $ATi \times Si_{BB}(t)$ with $ATi^*/|ATi|^2$.

$$ATi \times Si_{BB}(t) \times ATi^*/|ATi|^2 = Si_{BB}(t) \qquad \text{Equation 5}$$

As shown in Equation 5, a signal equivalent to the transmission signal $Si_{BB}(t)$, which is unaffected by the phase and amplitude characteristics of the transmission circuit 52-$i$ can be obtained.

The digital frequency converter 412 up-converts the output $Si_{BB}(t)$ of the calibration circuit 408 into the transmission signal $Si_{IF}(t)$ of the IF band. A D/A converter 414 converts the output signal of the digital frequency converter 412 to an analog signal. The analog signal is input to the transmission circuit 52-$i$.

The transmission circuit 52-$i$ amplifies, up-converts, and filters the transmission signal $S_{IF}(t)$ to output the transmission signal $ATi \times S_{RF1}(t)$ of the RF1 band. The transmission circuit 52-$i$ includes an amplifier 416, an up-converter 418, a filter 422, and the like. The output signal of the transmission circuit 52-$i$ is input to the calibration circuit 408 through the duplexer 54-$i$, the coupler 56-$i$, the antenna switch 62, the transmission/reception switch 64, and the reception circuit 68.

Furthermore, the output signal of the transmission circuit 52-$i$ is input to the antenna 58-$i$. Thus, the relay apparatus 13 transmits the signal received by the antenna 30$a$ or 30$b$ of the feeder link from the antenna 58-$i$ of the service link.

When beamforming is used for the feeder link as well, the transmitter 104$a$ and 104$b$ for the feeder link are configured in the same way as in FIG. 9.

[Calibration Example]

An example of the calibration of the relay apparatus 13, including the operation of FIGS. 8 and 9, will be explained with reference to the flowchart of FIG. 10. The relay apparatus 13 may repeat the process shown in FIG. 10 at regular intervals, or it may continuously repeated.

In step S12, the calibration signal generator 72 generates a calibration signal $C_{BB}(t)$.

In step S14, the transmission/reception switch 64 is switched to the reception side and the output $C_{RF1}(t)$ of the calibration signal transmission circuit 74 is added to the reception signal $Si_{RF1}(t)$ in the coupler 56-*i* via the transmission/reception switch 64 and the antenna switch 62.

In step S16, the characteristics estimation circuit 76 estimates the variation in the phase and amplitude characteristics ARi of the reception circuit 82-*i* based on the signal ARi{$Si_{BB}(t)+C_{BB}(t)$} of the BB band and the calibration signal $C_{BB}(t)$. The signal ARi{$Si_{BB}(t)+C_{BB}(t)$} is obtained by the digital frequency converter 312 based on the output of the reception circuit 82-*i*. The characteristics estimation circuit 76 supplies the estimated variation to the reception weight circuit 98.

In step S18, the reception weight circuit 98 corrects the reception weight based on the estimated variation. Thereby, the beamforming circuit 88 outputs the reception signal $Si_{BB}(t)$ in which the variation in the phase and amplitude characteristics ARi of the reception circuit 82-*i* is compensated for.

In step S22, the calibration signal generator 72 stops generating the calibration signal $C_{BB}(t)$.

In step S24, the transmission/reception switch 64 is switched to the transmission side and the output ATi×$Si_{RF1}$(t) of the transmission circuit 52-*i* is input to the reception circuit 68 via the duplexer 54-*i*, the coupler 56-*i*, the antenna switch 62, and the transmission/reception switch 64.

In step S26, the characteristics estimation circuit 70 estimates the variation in the phase and amplitude characteristics ATi of the transmission circuit 52-*i* based on the output ATi×$Si_{BB}(t)$ of the reception circuit 68 and the output signal $Si_{BB}(t)$ of the beamforming circuit 38, and supplies the estimated variation to the transmission weight circuit 42.

In step S28, the transmission weight circuit 42 corrects the transmission weight based on the estimated variation. Thereby, the beamforming circuit 38 outputs the transmission signal $Si_{BB}(t)$ in which the variation in the phase and amplitude characteristics ATi of the transmission circuit 52-*i* is compensated for.

Figure 10:
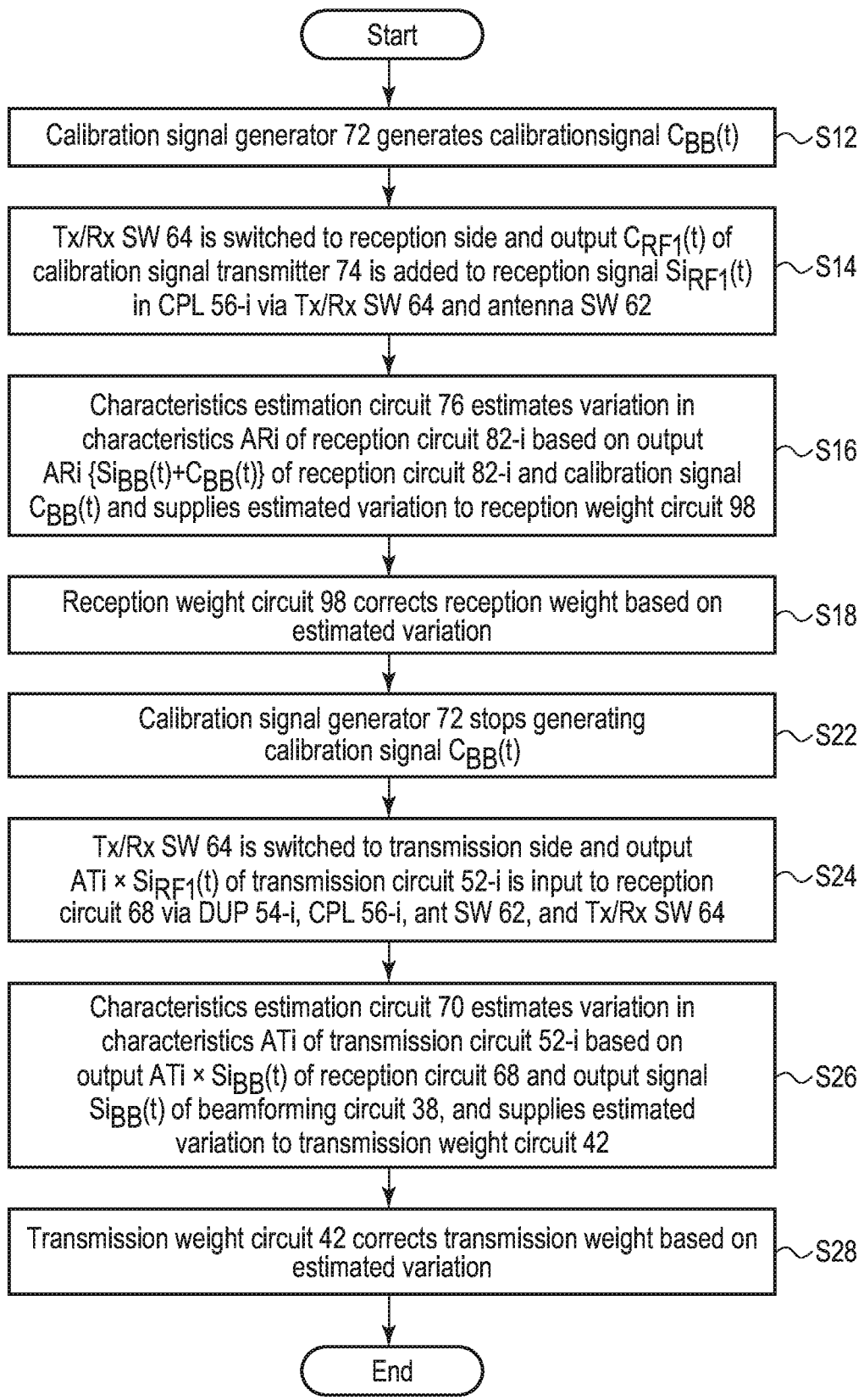
FIG. 10 illustrates a flowchart of an example of an operation of the electronic apparatus according to the first embodiment.

Note that, in the example of FIG. 10, transmission calibration is performed after the reception calibration is performed. The order of calibrations can be reversed or both calibrations may be performed at the same time.

As explained above, according to the first embodiment, the calibration signal of a frequency band different from that of the reception signal is mixed with the reception signal. The phase and amplitude of the reception signal mixed with the calibration signal is compared to the phase and amplitude of the calibration signal. Thus, variations in the phase and amplitude characteristics of the receiver can be measured. Therefore, the reception signal and the calibration signal are not mixed, and calibration can be carried out during reception of signals.

Furthermore, the multiple estimates are weighted according to the power of the transmission signal to estimate the variation in the phase and frequency characteristics of the transmitter. Therefore, even when the transmission power is low, the estimation accuracy does not decrease.

[Modification of First Embodiment]

In FIG. 8, which relates to the reception calibration of the service link, the reception circuit 82-1 of the service link amplifies the RF1 band signal, once down-converts the signal to an IF band signal, filters the signal. The digital frequency converter 312 down-converts the digital signal in the IF band to a digital signal in the BB band. The digital frequency converter 316 up-converts the calibrated BB band digital signal into the RF2 band digital signal. The transmitter 104*a* or 104*b* of the feeder link does not up-convert the input signal, but amplifies and filters the input signal. However, the examples of the bands for each signal are not limited thereto, and may vary.

Figure 11:
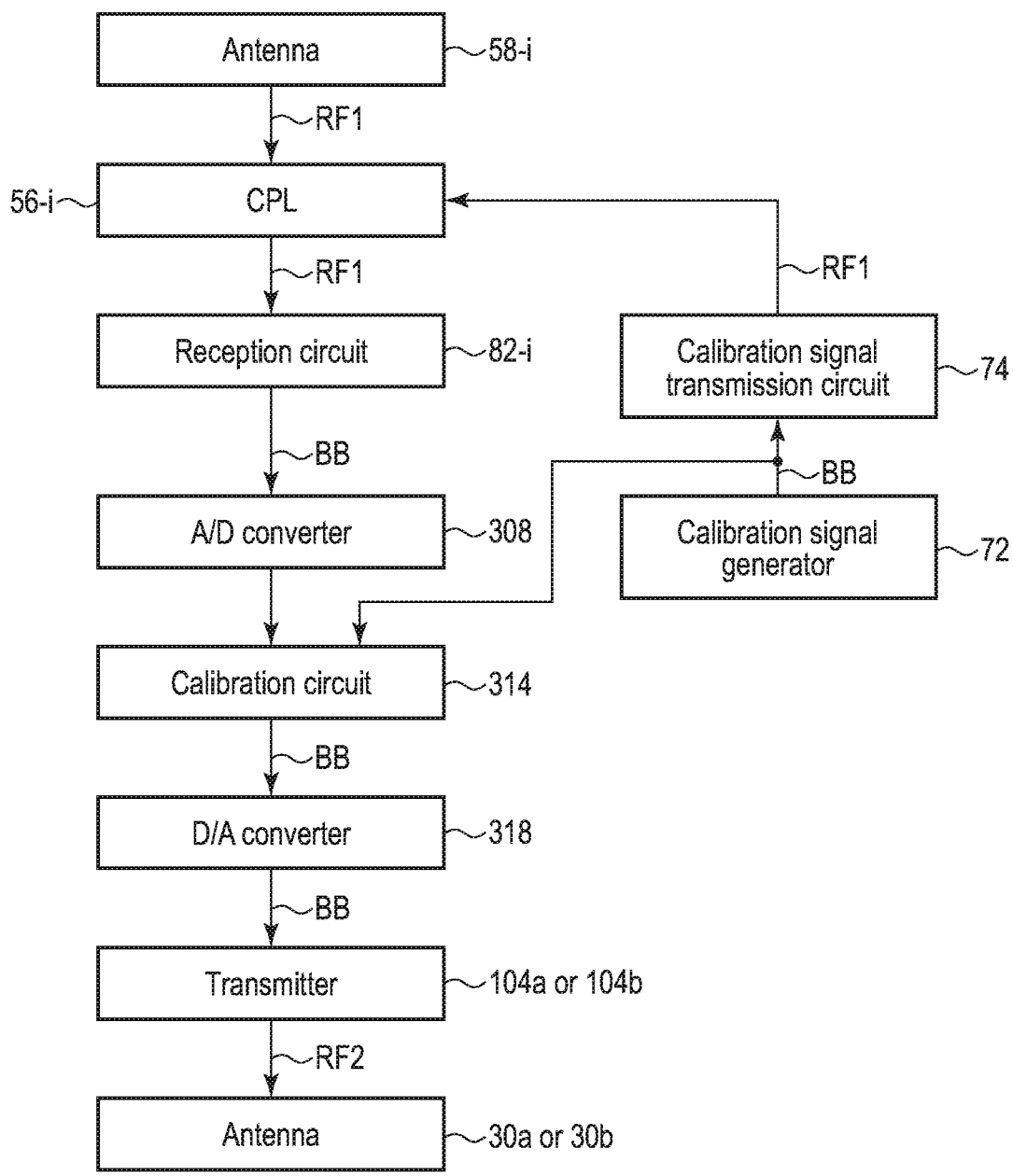
FIG. 11 illustrates a block diagram of another example of the part of the electronic apparatus related to the reception calibration of the service link according to the first embodiment.

In the example of FIG. 11, the reception circuit 82-*i* amplifies an RF1 band signal output from the coupler 56-*i*, and down-converts it to a BB band signal, and filters it. The transmitter 104*a* or 104*b* amplifies a BB band signal output from the D/A converter 318 and up-converts it to an RF2 band signal and filters it.

In the example of FIG. 12, the reception circuit 82-1 receives an RF1 band reception signal output from the coupler 56-*i*, amplifies it, down-converts to an IF band reception signal, and filters it. The calibration signal transmission circuit 74 amplifies a BB band calibration signal, and up-converts it to two types of signals: an RF1 band calibration signal and an IF band calibration signal. The IF band calibration signal output from the calibration signal transmission circuit 74 is input to the calibration circuit 314. The calibration circuit 314 processes IF band digital signals and outputs an IF band digital signal. The transmitter 104*a* or 104*b* amplifies an TF band signal output from the D/A converter 318 and up-converts it to an RF2 band signal, and filters it.

Figure 13:
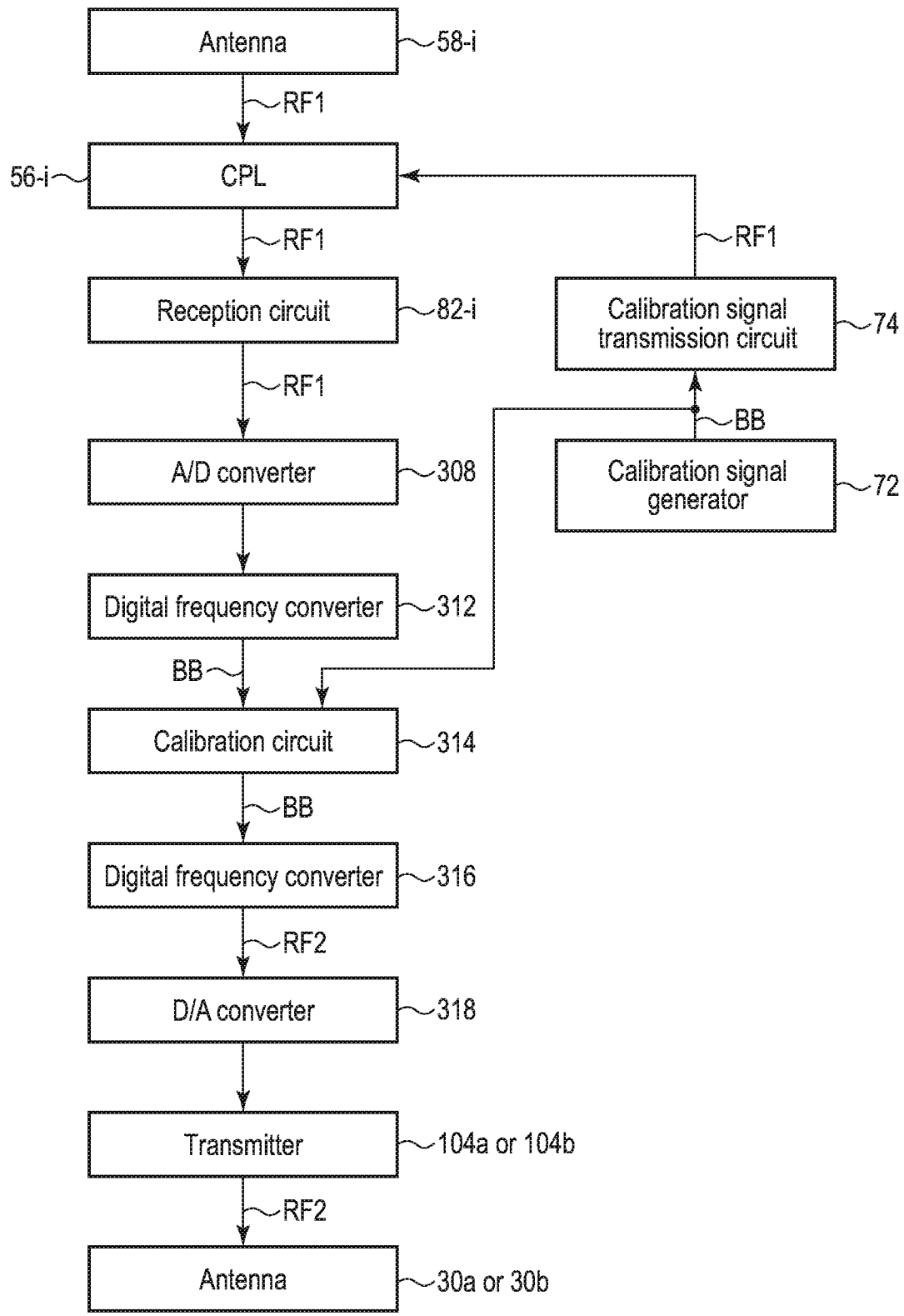
FIG. 13 illustrates a block diagram of another example of the part of the electronic apparatus related to the reception calibration of the service link according to the first embodiment.

In the example of FIG. 13, the reception circuit 82-*i* receives an RF1 band reception signal output from the coupler 56-*i*, which is not down-converted, and amplifies and filters it to be output. The digital frequency converter 312 down-converts an RF1 band digital signal output from the A/D converter 308 to a BB band digital signal. The digital frequency converter 316 up-converts the Sb band digital signal output from the calibration circuit 314 to an RF2 band digital signal. The transmitter 104*a* or 104*b* does not up-convert an RF2 band analog signal output from the D/A converter 318, and amplifies and filters it to be output.

Figure 14:
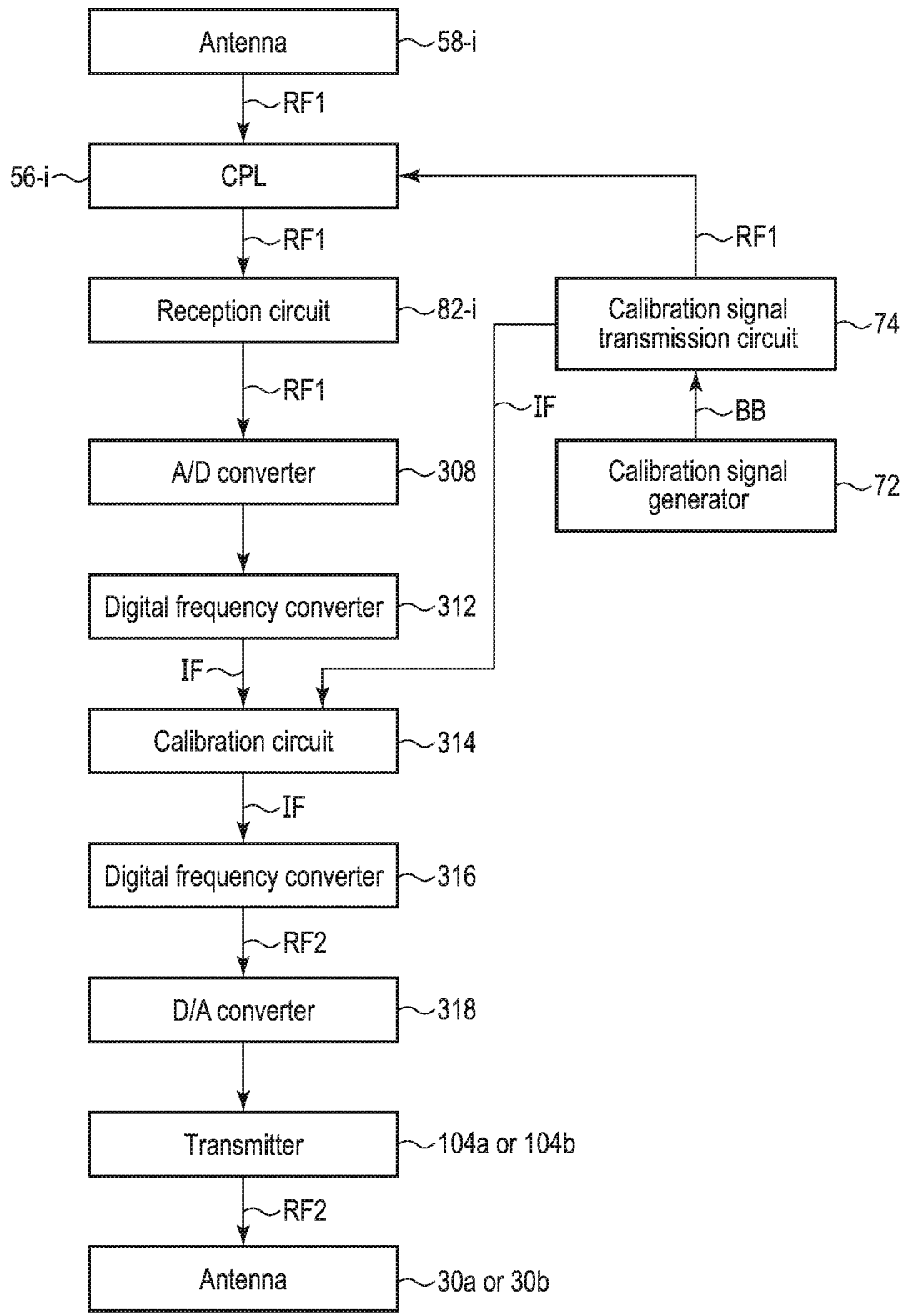
FIG. 14 illustrates a block diagram of another example of the part of the electronic apparatus related to the reception calibration of the service link according to the first embodiment.

In the example of FIG. 14, the reception circuit 82-*i* receives an RF1 band reception signal output from the coupler 56-*i*, which is not down-converted, and amplifies and filters it to be output. The digital frequency converter 312 down-converts an RF1 band digital signal output from the A/D converter 308 to an IF band digital signal. The calibration signal transmission circuit 74 amplifies a BB band calibration signal, up-converts it into two types of signals: an RF1 band calibration signal and an IF band calibration signal, and filters them. The IF band calibration signal output from the calibration signal transmission circuit 74 is input to the calibration circuit 314. The calibration circuit 314 processes IF band digital signals and outputs an IF band digital signal. The digital frequency converter 316 up-converts the IF band digital signal output from the calibration circuit 314 into an RF2 band digital signal. The transmitter 104*a* or 104*b* does not up-convert an RF2 band analog signal output from the D/A converter 318, but amplifies and filters it to be output.

Figure 15:
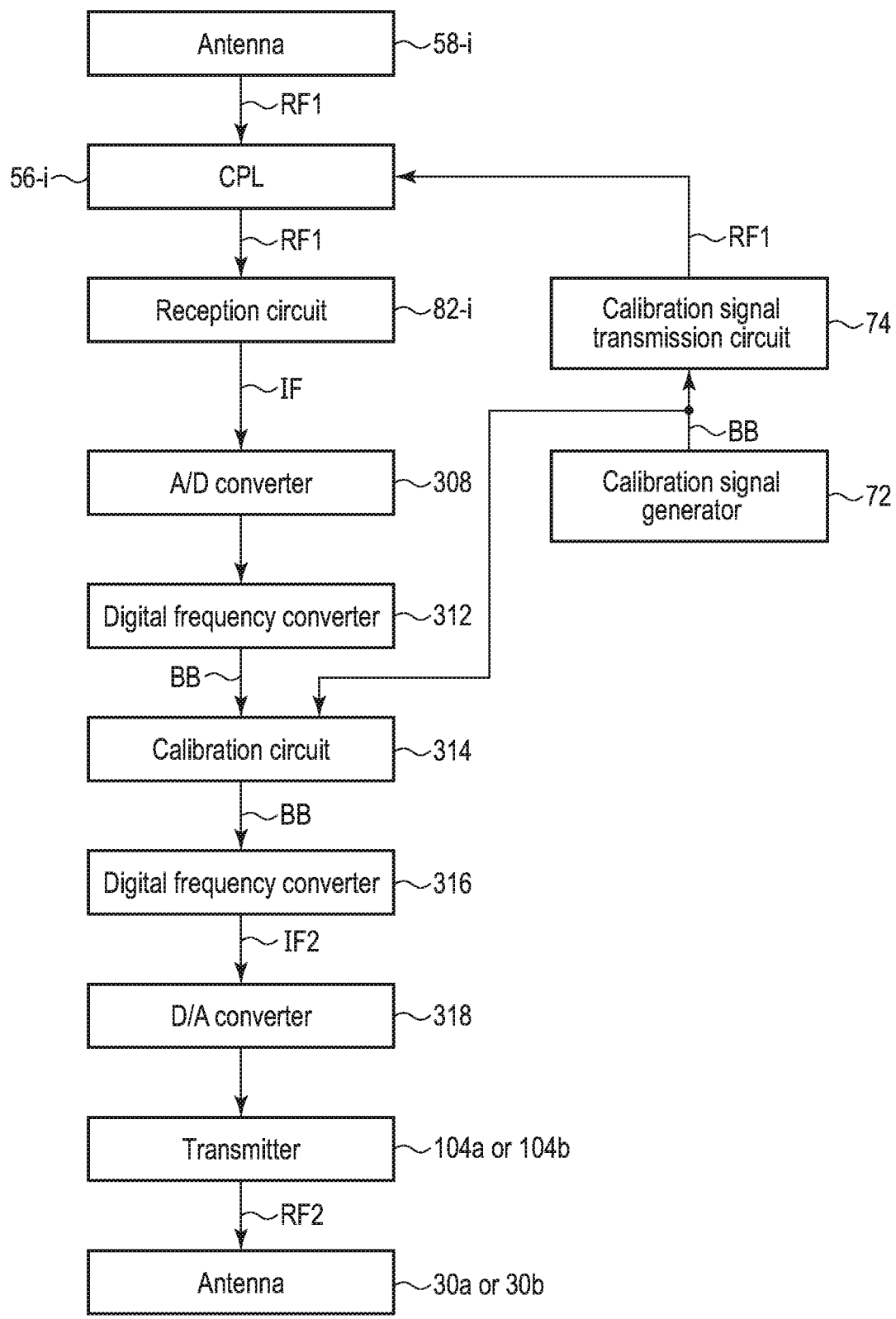
FIG. 15 illustrates a block diagram of another example of the part of the electronic apparatus related to the reception calibration of the service link according to the first embodiment.

In the example of FIG. 15, the reception circuit 82-1 receives an RF1 band reception signal output from the coupler 56-*i*, amplifies it, down-converts it to an IF1 band signal, and filters it. The digital frequency converter 312 down-converts an IF1 band digital signal output from the A/D converter 308 to a BB band digital signal. The digital frequency converter 316 up-converts a BB band digital signal output from the calibration circuit 314 to an IF2 band digital signal. The transmitter 104*a* or 104*b* amplifies an IF2 band analog signal output from the D/A converter 318 to an RF2 band signal, which is filtered, and output.

In FIG. 9, which relates to the transmission calibration of the service link, the feeder link receiver 36*a* or 36*b* amplifies and filters the RF2 band signal without down-converting it, and then the digital frequency converter 406 down-converts the RF2 band digital signal to the BB band digital signal. The digital frequency converter 412 up-converts the calibrated BB hand digital signal to the IF band digital signal. The transmission circuit 52-*i* of the service link amplifies the IF band signal, up-converts it to the RF2 band signal, and filters it. However, the examples of the bands of each signal are not limited thereto, and may be varied.

Figure 16:
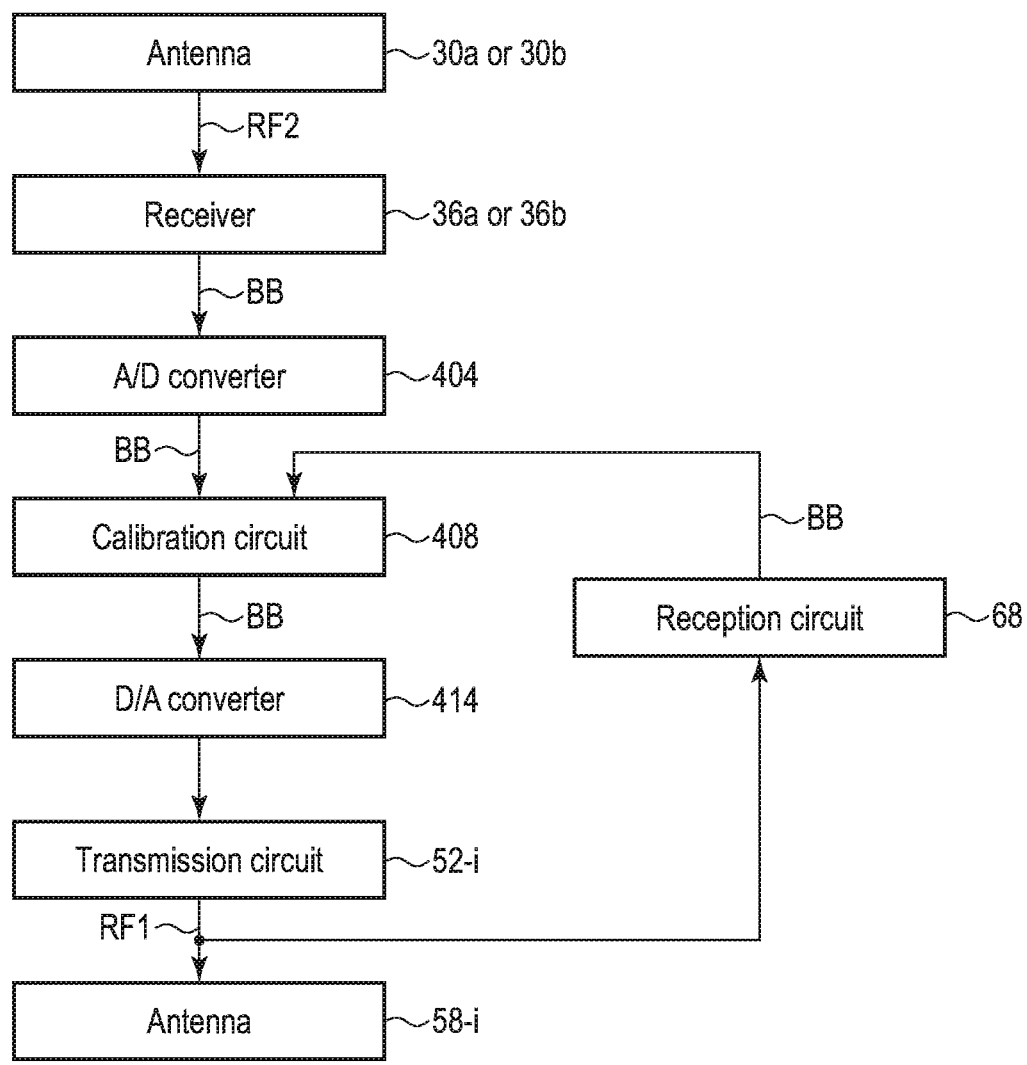
FIG. 16 illustrates a block diagram of another example of the part of the electronic apparatus related to the transmission calibration of the service link according to the first embodiment.

In the example of FIG. 16, the receiver 36*a* or 36*b* amplifies an RF2 band signal output from the antenna 30*a* or 30*b*, down-converts it to a BB band signal, and filters it. The A/D converter 404 converts a BB band analog signal to a digital signal and supplies the BB band digital signal to the calibration circuit 408.

The D/A converter 414 converts a BB digital signal output form the calibration circuit 408 to an analog signal. The transmission circuit 52-1 amplifies a BR band analog signal output from the D/A converter 414, up-converts the BB band signal to the RF1 band analog signal, and filters it.

Figure 17:
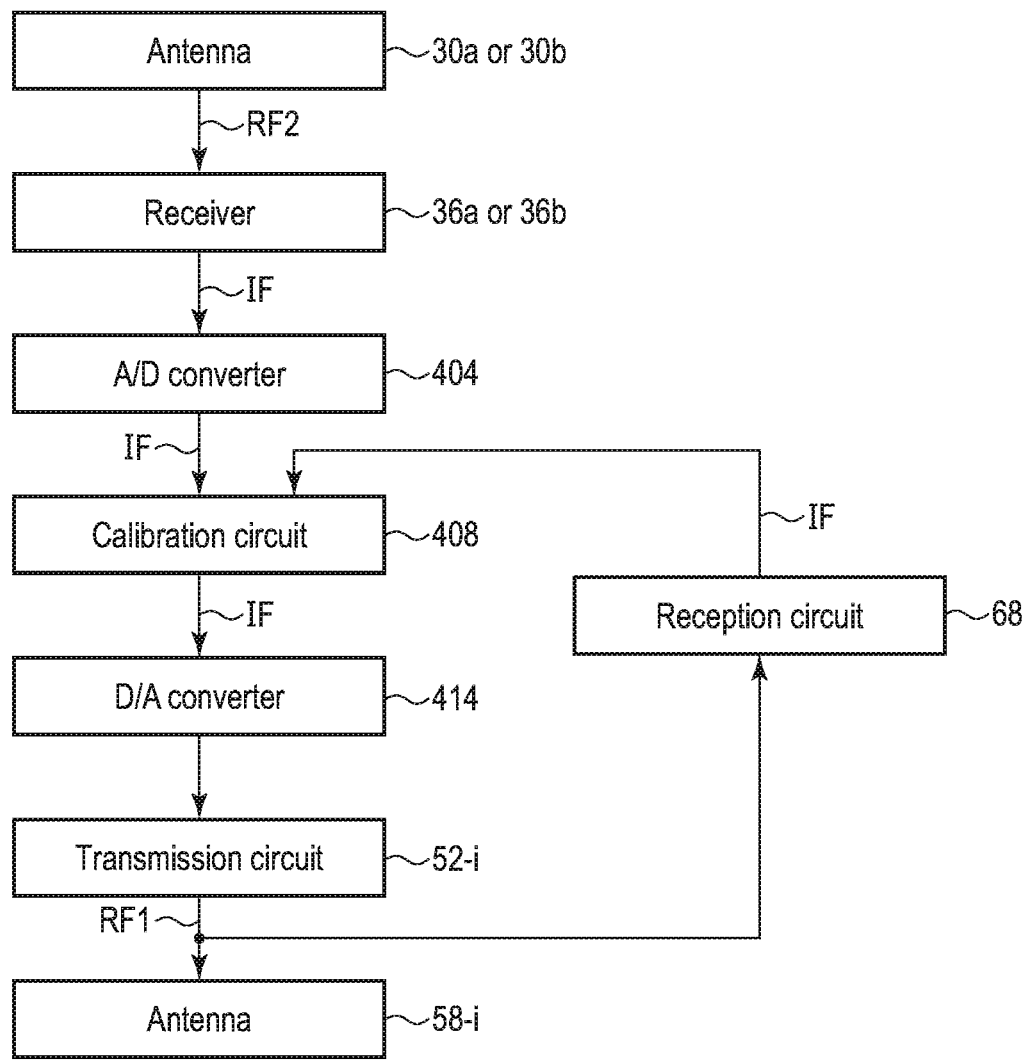
FIG. 17 illustrates a block diagram of another example of the part of the electronic apparatus related to the transmission calibration of the service link according to the first embodiment.

In the example of FIG. 17, the receiver 36*a* or 36*b* amplifies an RF2 band signal output from the antenna 30*a* or 30*b*, down-converts the amplified signal to an IF band signal, and filters it. The A/D converter 404 converts an IF band analog signal to an IF band digital signal and supplies the IF band digital signal to the calibration circuit 408. The reception circuit 68 amplifies an output of the transmission circuit 52-*i*, down-converts the output of the transmission circuit 52-*i* to an IF band signal, and filters it. The calibration circuit 408 processes IF band signals output from the A/D converter 404 and the reception circuit 68. The D/A converter 414 converts an IF-band digital signal from the calibration circuit 408 to an analog signal. The transmission circuit 52-*i* amplifies an IF band analog signal output from the D/A converter 414, up-converts it to an FRI band signal, and filters the signal.

In the example of FIG. 18, the receiver 336*a* or 36*b* amplifies an RF2 band signal output from the antenna 30*a* or 30*b*, down-converts the signal, and filters the signal to be output. The digital frequency converter 406 down-converts an RF2 band digital signal to a BB band signal. The BB band digital signal is input to the calibration circuit 408. The digital frequency converter 412 up-converts a BB band digital signal output from the calibration circuit 408 to an RF1 band digital signal. The transmission circuit 52-*i* amplifies and filters an RF1 band analog signal output from the D/A converter 414 without up-converting the signal, and outputs the signal.

In the example of FIG. 19, the receiver 36*a* or 36*b* amplifies an RF2 band signal output from the antenna 33*a* or 30*b*, filters it, and outputs it without down-conversion. The digital frequency converter 406 down-converts an RF2 band digital to an IF band digital signal, and supplies the IF band digital signal to the calibration circuit 408. The reception circuit 68 amplifies the output of the transmission circuit 52-*i*, down-converts it to an IF band analog signal, and filters it. The calibration circuit 408 processes IF band signals output from the digital frequency converter 406 and the reception circuit 68. The digital frequency converter 412 up-converts an IF band digital signal output from the calibration circuit 408 to an RF1 band digital signal. The transmission circuit 52-*i* amplifies an RF1 band analog signal output from the D/A converter 414, filters it, and outputs it without up-conversion.

In the example of FIG. 20, the receiver 36*a* or 36*b* amplifies an RF2 band signal output from the antenna 30*a* or 30*b*, down-converts it to an IF2 band signal, filters it to be output. The digital frequency converter 406 down-converts an IF2 band digital signal to a BB band digital signal, and supplies the BB band digital signal to the calibration circuit 408. The digital frequency converter 412 up-converts a BB band digital signal output from the calibration circuit 408 to an IF1 band digital signal. The transmission circuit 52-*i* amplifies an IF1 band analog signal output from the D/A converter 414 to an RF1 band signal, filters it to be output.

Second Embodiment

Figure 21:
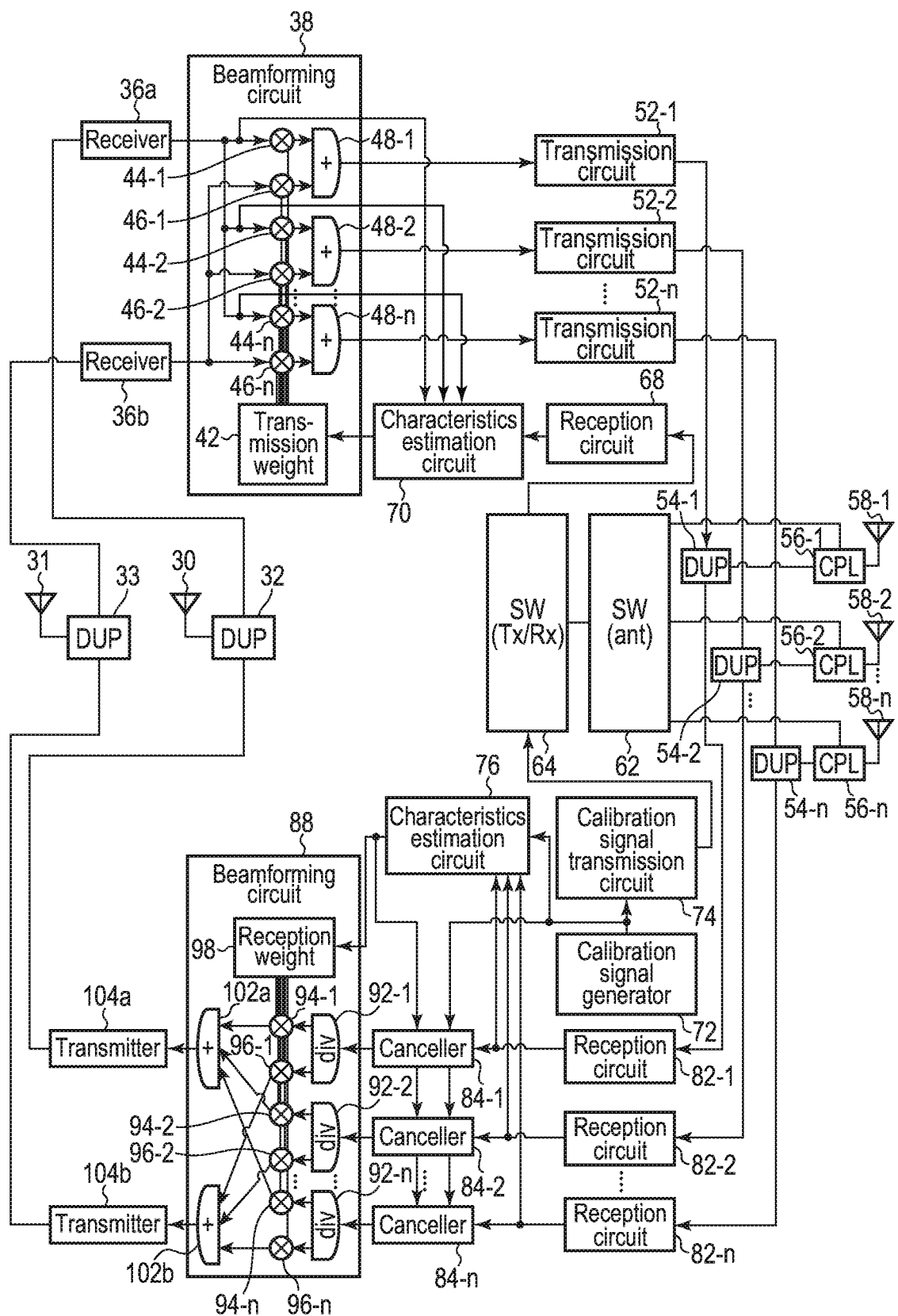
FIG. 21 illustrates a circuit diagram of an example of an electronic apparatus according to a second embodiment.

With reference to FIG. 21, an example of an electronic apparatus according to a second embodiment will be described. FIG. 21 is a circuit diagram of an example of the electronic apparatus according to the second embodiment. The second embodiment is basically the same as the first embodiment, but the configuration of the characteristics estimation circuit 70 is different. In FIG. 2, the output signal of the beamforming circuit 38 is input to the characteristics estimation circuit 70, but in the second embodiment of FIG. 21, the input signal of the beamforming circuit 38 is input to the characteristics estimation circuit 70.

Thus, the characteristics estimation circuit 70 compares the phases and amplitudes of the transmission signals before beamforming and the phases and amplitudes of the signals after the transmission and reception processing via the transmission circuits 52-1 to 52-*n* and the reception circuit 68, Then, the characteristics estimation circuit 70 estimates the errors, that is, variations in the phase and amplitude characteristics between the transmission circuits 52-1 to 52-*n* based on the comparison result.

In the second embodiment, the estimated value of the variation in the phase and amplitude characteristics converges to zero. If the estimated value converges to zero, the control may become unstable, and the control according to the first embodiment may be more stable than in the second embodiment. Note that it may be difficult to configure the beamforming circuit 38 of FIG. 2 with an analog circuit. However, the beamforming circuit 38 of FIG. 21 can be configured with an analog circuit.

Figure 22:
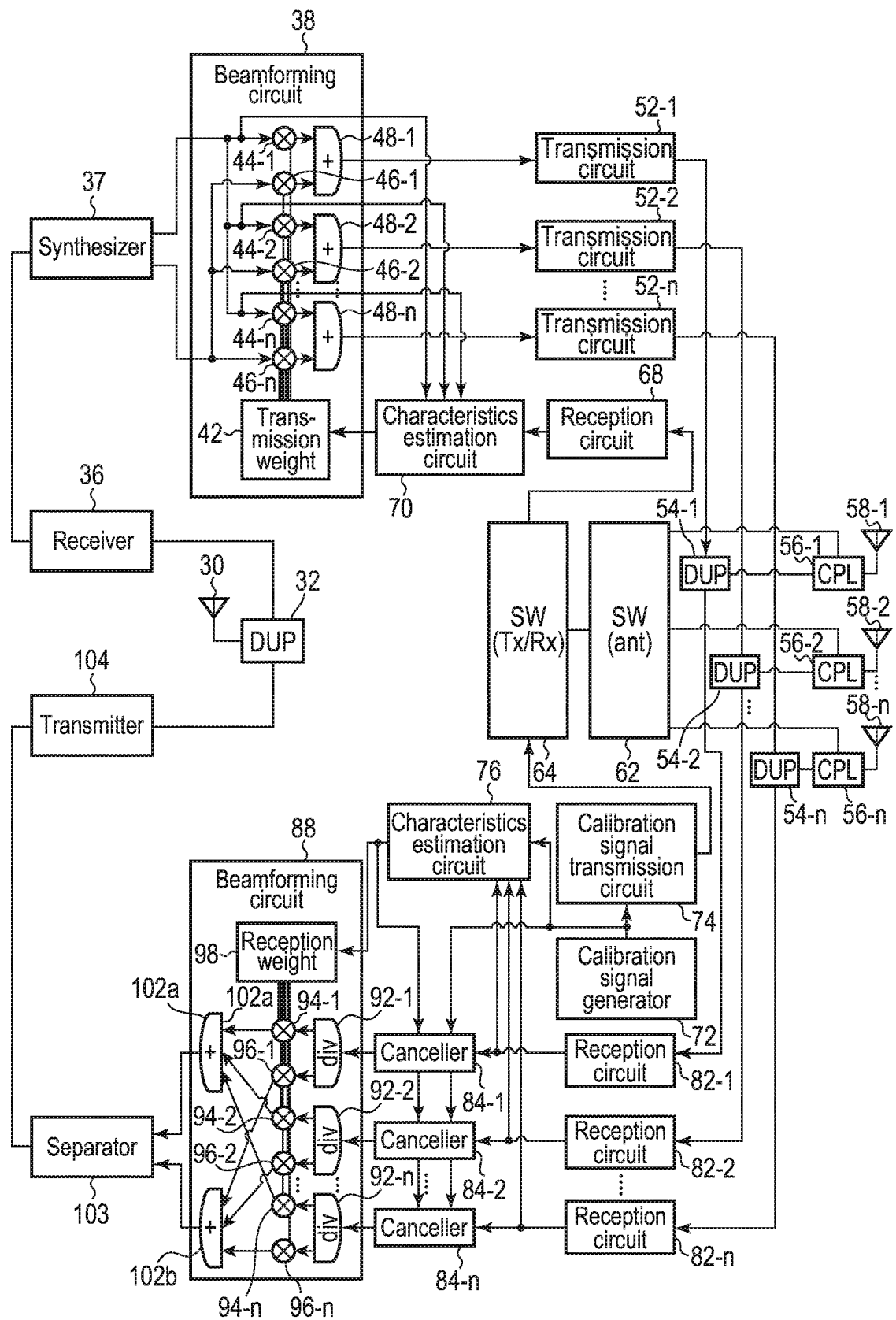
FIG. 22 illustrates a circuit diagram of another example of the electronic apparatus according to the second embodiment.

FIG. 22 is a circuit diagram of another example of the electronic apparatus according to the second embodiment. In FIG. 22, as in FIG. 3, the antenna 3', the receiver 36, and the transmitter 104 are commonly used for the first and second cells.

Third Embodiment

With reference to FIG. 23, an example of an electronic apparatus according to the third embodiment will be described. FIG. 23 shows an example of a circuit diagram of the electronic apparatus according to the third embodiment. In the first and second embodiments, the antenna 58-*i* of the service link includes an antenna for both transmission and reception. In the third embodiment, however, the antenna of the service link includes a transmission antenna and a reception antenna. The transmission/reception array antenna including a plurality of antennas (only 122*a* and 122*b* are shown) is connected to the receivers 36*a* and 36*b* via a duplexer 124. The transmission/reception array antenna including a plurality of antennas (only 126*a* and 126*b* are shown) is connected to the transmitter 104*a* and 104*b* via a duplexer 128.

The third embodiment is different from the first embodiment in that the output signal of the transmission circuit 52-*i* is input to a transmission antenna 134-*i* via a coupler 132-*i*, and is input to the reception circuit 68 via an antenna switch 136. The antenna switch 136 selects the signal from the coupler 132-$i$. Furthermore, the output signal of the calibration signal transmission circuit 74 is mixed to the signal from the reception antenna 142-$i$ in the coupler 144-$i$ via an antenna switch 146.

An example of the calibration of the third embodiment is explained with reference to the flowchart of FIG. 24. The process of FIG. 24 may be repeated at regular intervals or may be repeated continuously.

In step S42, the calibration signal generator 72 generates a calibration signal $C_{BB}(t)$.

In step S44, an output $C_{RF1}(t)$ of the calibration signal transmission circuit 74 is added to a reception signal $Si_{RF1}(t)$ at the coupler 144-$i$ via the antenna switch 146.

In step S46, the characteristics estimation circuit 76 estimates a variation in the phase and amplitude characteristics ARi of the reception circuit 82-$i$ based on the output ARi{$Si_{BB}(t)+C_{BB}(t)$} of the reception circuit 82-$i$ and the calibration signal $C_{BB}(t)$, and supplies the estimated variation to the reception weight circuit 98.

In step S48, the reception weight circuit 98 corrects the reception weight based on the estimated variation. Thereby, the beamforming circuit 88 outputs the reception signal $Si_{BB}(t)$ in which the variation in the phase and amplitude characteristics ARi of the reception circuit 32-$i$ is compensated for.

In step S54, the output ATi×$Si_{RF1}(t)$ of the transmission circuit 52-$i$ is input to the reception circuit 68 via the coupler 132-$i$ and the antenna switch 136.

In step S56, the characteristics estimation circuit 70 estimates the variation in the phase and amplitude characteristics ATi of the transmission circuit 52-$i$ based on the output ATi×$Si_{BB}(t)$ of the reception circuit 68 and the output signal $Si_{BB}(t)$ of the beamforming circuit 38, and supplies the estimated variation to the transmission weight circuit 42.

In step S58, the transmission weight circuit 42 corrects the transmission weight based on the estimated variation. Thereby, the beamforming circuit 38 outputs the transmission signal $Si_{BB}(t)$ in which the variation in the phase and amplitude characteristics ATi of the transmission circuit 52-$i$ is compensated for.

Figure 24:
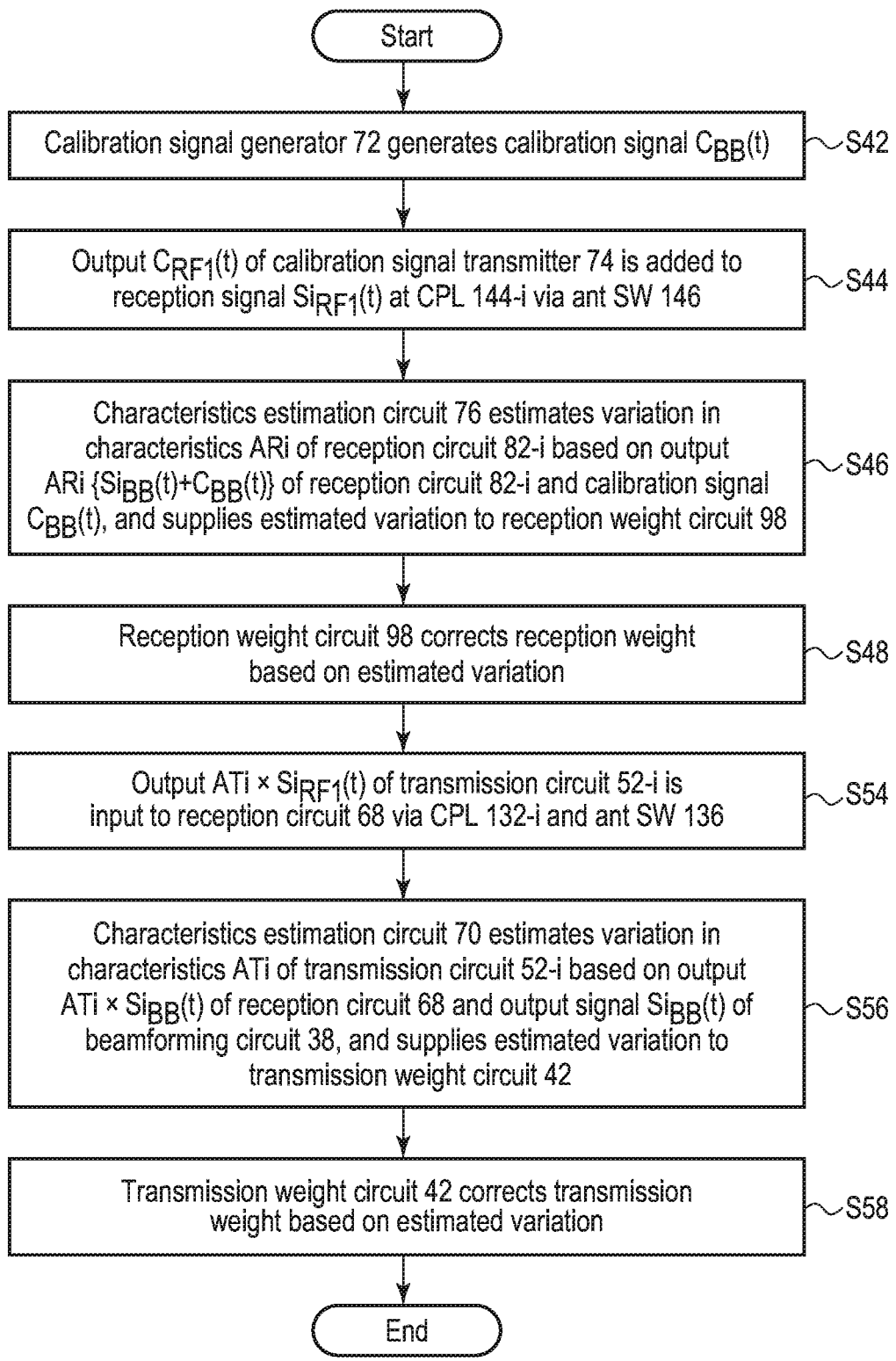
FIG. 24 illustrates a flowchart of an example of operation of the electronic apparatus according to the third embodiment.

In the example of FIG. 24, the transmission calibration is performed after performing the reception calibration. However, the order of performing the calibrations can be reversed or both calibrations may be performed at the same time.

Fourth Embodiment

Figure 25:
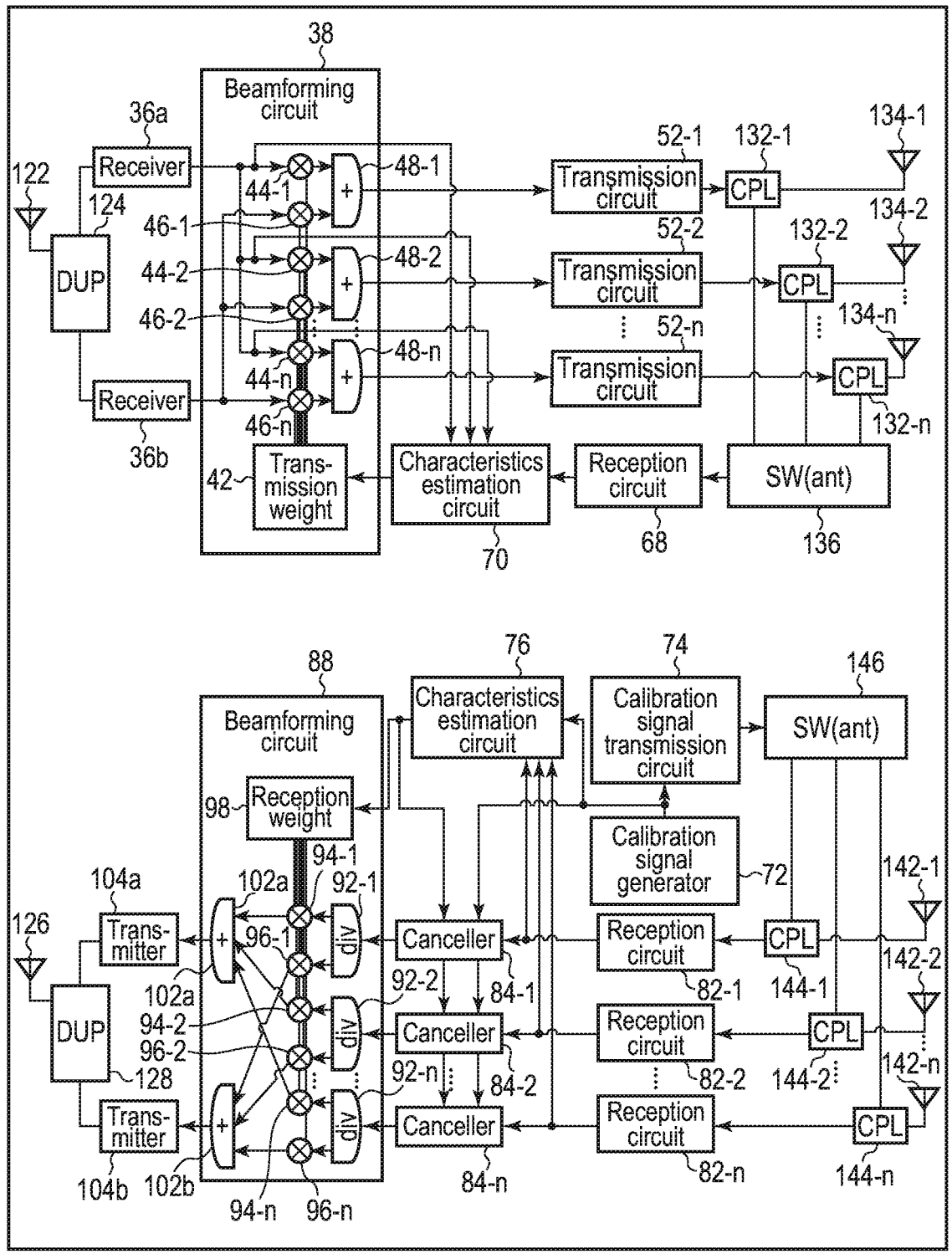
FIG. 25 illustrates a circuit diagram of an example of an electronic apparatus according to a fourth embodiment.

FIG. 25 is a circuit diagram showing an example of an electronic apparatus according to a fourth embodiment. The fourth embodiment is basically the same as the third embodiment, but the configuration of the characteristics estimation circuit 70 is different. In the third embodiment of FIG. 23, the output signal of the beamforming circuit 38 is input to the characteristics estimation circuit 70, while in the fourth embodiment of FIG. 25, the input signal of the beamforming circuit 38 is input to the characteristics estimation circuit 70. As in the second embodiment, the characteristics estimation circuit 70 estimates the error, that is, variations in the phase and amplitude characteristics between the transmission circuits 52-1 to 52-$n$ by comparing the phase and amplitude of the transmission signal before beamforming and the phase and amplitude of the signal after the transmission and reception processing via the transmission circuits 52-1 to 52-$n$ and the reception circuit 68.

Fifth Embodiment

In the first to fourth embodiments, when performing beamforming using a plurality of antennas, variations in the phase and amplitude characteristics between the transmission signal and the reception signals of a plurality of antennas are compensated for.

A fifth embodiment relates to calibration of compensating for, instead of variations in the phase and amplitude characteristics between multiple transmission signals and the reception signals, a difference between the phase and amplitude characteristics of one receiver circuit and the desired phase and amplitude characteristics. FIG. 26 is a circuit diagram of an example of the electronic apparatus according to the fifth embodiment. FIG. 26 shows an example of the calibration related to one reception circuit 82-$i$ according to the first embodiment of FIG. 2, the second embodiment of FIG. 21, the third embodiment of FIG. 23, or the fourth embodiment of FIG. 25.

The signal from a reception antenna 202 (corresponding to the antenna 58-$i$ of the first embodiment) is supplied, through a coupler 204 (corresponding to the coupler 56 of the first embodiment) to a receiver 206 (corresponding to the reception circuit 82-$i$ of the first embodiment). The receiver 206 amplifies, down-converts, and filters the input signal. A calibration signal generator 218 (corresponding to the calibration signal generator 72 of the first embodiment) generates a calibration signal to be input to a calibration signal transmission circuit 222 (corresponding to the calibration signal transmission circuit 74 of the first embodiment). The calibration signal transmission circuit 222 up-converts, amplifies, and filters the calibration signal output from the calibration signal generator 218. The output signal of the calibration signal transmission circuit 222 is mixed with the signal from the reception antenna 202 in the coupler 204.

The output signal of the receiver 206 is, through a canceller 208 (corresponding to the canceller 84-$i$ of the first embodiment), supplied to a calibration circuit 212 (corresponding to the beamforming circuit 88 of the first embodiment). The output signal of the receiver 206 is also supplied to a characteristics estimation circuit 216 (corresponding to the characteristics estimation circuit 76 of the first embodiment). The output signal of the calibration signal generator 218 is also supplied to the characteristics estimation circuit 216. The output signal of the calibration circuit 212 is input to a reception signal processor 214. The reception signal processor 214 may be the feeder link transmitter 104$a$ or 104$b$, or the switch 34 or 32, or the antenna 30$a$ or 30$b$ of the first embodiment.

The characteristics estimation circuit 216 can estimate the phase and amplitude characteristics of the receiver 206 by comparing the phase and amplitude of the reception signal from the receiver 206 which is mixed with the calibration signal and the phase and amplitude of the calibration signal.

The canceller 208 cancels the calibration signal from the output of the receiver 206 based on the results of estimation of the phase and amplitude characteristics of the receiver 206 and the calibration signal. The calibration circuit 212 adjusts the phase and amplitude characteristics of the input signal to compensate for the deviation in the phase and amplitude characteristics of the receiver 206 which has performed the reception process of the signal from the antenna 202. Thus, the difference between the phase and amplitude characteristics of the receiver 206 and the desired phase and amplitude characteristics can be compensated for.

Sixth Embodiment

The sixth embodiment relates to calibration that compensates for a difference between the phase and amplitude characteristics of a single transmitter circuit and the desired phase and amplitude characteristics. FIG. 27 is a circuit diagram of an example of the electronic apparatus according to the sixth embodiment. FIG. 27 shows calibration related to the transmission circuit 52-$i$ of the first embodiment of FIG. 2 or the third embodiment of FIG. 23.

An output signal of a transmission signal generator 232 is input to a calibration circuit 234 (corresponding to the beamforming circuit 36 of the first embodiment). The transmission signal generator 232 may be the antenna 30$a$ or 30$b$, the switch 32 or 34, or the transmitter 104$a$ or 104$b$ of the first embodiment.

An output signal of the calibration circuit 234 is, through a transmitter 236 (corresponding to the transmission circuit 52-$i$ of the first embodiment) and a coupler 238 (corresponding to the coupler 56-$i$ of the first embodiment), input to a transmission antenna 242 (corresponding to the antenna 58-$i$ of the first embodiment). The output signal of the calibration circuit 234 is, through a transmitter 236 and a coupler 238, input to a receiver 244 (corresponding to the reception circuit 68 of the first embodiment).

An output signal of the receiver 244 is input to a characteristics estimation circuit 246 (corresponding to the characteristics estimation circuit 70 of the first embodiment). To the characteristics estimation circuit 246, the output signal of the calibration circuit 234 (i.e., the input of the transmitter 236) is also supplied. The characteristics estimation circuit 246 can estimate the phase and amplitude characteristics of the transmitter 236 by comparing the phase and amplitude of the output signal of the transmitter 236 with the phase and amplitude of the output signal of the transmitter 236 after the reception process by the receiver 244.

The calibration circuit. 234 adjusts the phase and the amplitude of the input signal to compensate for the variations in the phase and amplitude characteristics of the transmitter 236. Thus, the difference between the phase and amplitude characteristics of the transmitter 236 and the desired phase and amplitude characteristics can be compensated for.

Seventh Embodiment

FIG. 28 is a circuit diagram of an example of an electronic apparatus according to a seventh embodiment.

The seventh embodiment relates to calibration that compensate for a difference between the phase and amplitude characteristics of a single transmitter circuit and the desired phase and amplitude characteristics. FIG. 28 is a circuit diagram of an example of the electronic apparatus according to the seventh embodiment. FIG. 28 shows the calibration related to the transmission circuit 52-$i$ of the second embodiment of FIG. 21 or the fourth embodiment of FIG. 25.

The seventh embodiment differs from the sixth embodiment in the configuration of the characteristics estimation circuit. In FIG. 27, the output signal of the calibration circuit 234 is input to the characteristics estimation circuit 246. In the seventh embodiment of FIG. 28, the input signal of the calibration circuit 234 is input to the characteristics estimation circuit 252. Therefore, the characteristics estimation circuit 252 can estimate the phase and amplitude characteristics of the transmitter 236 by comparing the phase and the amplitude of the transmission signal before the calibration with the phase and the amplitude of the signal after the transmission process and the reception process through the transmitter 236 and the receiver 244.

The calibration circuit. 234 adjusts the phase and the amplitude of the input signal to correct the variation of the phase and amplitude characteristics of the transmitter 236. Thus, a difference between the phase and amplitude characteristics of the transmitter 236 and the desired phase and amplitude characteristics can be compensated for.

Although the embodiment is described as to be realized as a relay apparatus, the embodiment may be realized as a wireless communication apparatus which performs wireless communication with other wireless communication apparatuses. In that case, instead of the receiver of the feeder link, a transmission signal generator is connected, and instead of the transmitter of the feeder link, a receiver signal processor is connected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic apparatus comprising:
a receiver configured to receive a reception signal of a first frequency band from a first communication apparatus;
a signal addition circuit configured to add a calibration signal of a second frequency band which is different from the first frequency band to the reception signal;
an estimation circuit configured to estimate characteristics of the receiver based on an output signal of the receiver related to the reception signal and the calibration signal;
a correction circuit configured to correct the output signal of the receiver based on an estimation result of the estimation circuit; and
a transmitter configured to transmit an output signal of the correction circuit to a second communication apparatus which is different from the first communication apparatus.
2. The electronic apparatus of claim 1, wherein:
the receiver includes a plurality of receiver units, and
the estimation circuit is configured to estimate variations in phase and amplitude characteristics of the receiver units.
3. The electronic apparatus of claim 1, further comprising:
a canceller configured to subtract the calibration signal from the output signal of the receiver;
wherein the correction circuit is configured to correct an output signal of the canceller based on the estimation result of the estimation circuit.
4. The electronic apparatus of claim 1, further comprising:
a canceller configured to subtract the calibration signal from the output signal of the receiver;
wherein:
the receiver includes an amplifier;
the estimation circuit is configured to estimate phase and amplitude characteristics of the amplifier based on the output signal of the receiver and the calibration signal; and
the correction circuit is configured to correct phase and amplitude of the output signal of the canceller based on the estimation result of the estimation circuit.
5. The electronic apparatus of claim 1, wherein the second frequency band includes one or more frequency bands.

6. The electronic apparatus of claim 1, wherein:
the second frequency band includes different frequency bands, and
a center of gravity in a frequency direction of power of the calibration signal is within the first frequency band.

7. The electronic apparatus of claim 6, wherein a highest frequency of a lowest frequency band of the different frequency bands is lower than a lowest frequency of the first frequency band and a lowest frequency of a highest frequency band of the different frequency bands is higher than a highest frequency of the first frequency band.

8. The electronic apparatus of claim 1, wherein a highest frequency of the second frequency band is higher than a highest frequency of the first frequency band, and a lowest frequency of the second frequency band is lower than a lowest frequency of the first frequency band.

9. The electronic apparatus of claim 1, wherein:
the first frequency band includes a plurality of frequency bands, and
the second frequency band is between adjacent two of the plurality of frequency bands.

10. An electronic apparatus comprising:
a beamformer configured to generate and output a first signal;
a transmitter configured to generate a transmission signal by performing a transmission process with respect to the first signal;
a receiver configured to generate a second signal by performing a reception process with respect to the transmission signal that is supplied thereto from the transmitter via a duplexer, a coupler, and a switch; and
an estimation circuit configured to estimate characteristics of the transmission process based on a comparison between the first signal and the second signal and to output a final estimation result indicating the estimated characteristics of the transmission process to the beamformer,
wherein:
the beamformer applies a weight to the first signal based on the final estimation result; and
the estimation circuit is configured to estimate the characteristics of the transmission process a plurality of times to obtain a plurality of estimation results, and to apply weighting to the plurality of estimation results depending on a transmission power, such that a first weight is applied to one of the estimation results when the transmission power is a first power, and such that a second weight different from the first weight is applied to one of the estimation results when the transmission power is a second power different from the first power, wherein the estimation circuit obtains the final estimation result based on the weighted estimation results.

11. The electronic apparatus of claim 10, wherein:
a variation of the estimated characteristics is a first value when the transmission power is the first power or more, and
a variation of the estimated characteristics is a second value which is smaller than the first value when the transmission power is less than the first power.

12. The electronic apparatus of claim 10, wherein the second power is higher than the first power; and the second weight is larger than the first weight.

13. A method comprising:
receiving, by a receiver, a reception signal of a first frequency band from a first communication apparatus;
adding a calibration signal of a second frequency band which is different from the first frequency band to the reception signal;
estimating characteristics of the receiver based on an output signal of the receiver related to the reception signal and the calibration signal;
correcting the output signal of the receiver based on the estimated characteristics; and
transmitting a corrected output signal of the receiver to a second communication apparatus which is different from the first communication apparatus.

14. A method for an electronic apparatus comprising a beamformer which generates and outputs a first signal, a transmitter which generates a transmission signal by performing a transmission process with respect to the first signal; a receiver; an antenna connected to the transmitter; and an estimation circuit which estimates characteristics of the transmission process, the method comprising:
generating, by the receiver, a second signal by performing a reception process with respect to the transmission signal, the transmission signal being supplied to the receiver from the transmitter via a duplexer, a coupler, and a switch;
estimating, by the estimation circuit, the characteristics of the transmission process based on a comparison between the first signal and the second signal and outputting a final estimation result indicating the estimated characteristics of the transmission process to the beamformer; and
applying, by the beamformer, a weight to the first signal based on the final estimation result,
wherein said estimating the characteristics of the transmission process and outputting the final estimation result comprises estimating the characteristics of the transmission process a plurality of times to obtain a plurality of estimation results, and applying weighting to the plurality of estimation results depending on a transmission power, such that a first weight is applied to one of the estimation results when the transmission power is a first power, and such that a second weight different from the first weight is applied to one of the estimation results when the transmission power is a second power different from the first power, wherein the estimation circuit obtains the final estimation result based on the weighted estimation results and outputs said final estimation result.

15. The method of claim 14,
wherein:
the second power is higher than the first power; and
the second weight is larger than the first weight.

16. An electronic apparatus comprising:
a receiver configured to receive a reception signal of a first frequency band from a first communication apparatus;
a signal addition circuit configured to add a calibration signal of a second frequency band which is different from the first frequency band to the reception signal;
an estimation circuit configured to estimate characteristics of the receiver based on an output signal of the receiver related to the reception signal and the calibration signal;
a canceller configured to subtract the calibration signal from the output signal of the receiver;
a correction circuit configured to correct an output signal of the canceller based on the estimation result of the estimation circuit; and a transmitter configured to transmit an output signal of the correction circuit to a second communication apparatus which is different from the first communication apparatus.

17. A method comprising:
receiving, by a receiver, a reception signal of a first frequency band from a first communication apparatus;
adding, by a signal addition circuit, a calibration signal of a second frequency band which is different from the first frequency band to the reception signal;
estimating, by an estimation circuit, characteristics of the receiver based on an output signal of the receiver related to the reception signal and the calibration signal;
subtracting, by a canceller, the calibration signal from the output signal of the receiver;
correcting, by a correction circuit, an output signal of the canceller based on the estimation result of the estimation circuit; and
transmitting, by a transmitter, an output signal of the correction circuit to a second communication apparatus which is different from the first communication apparatus.

18. An electronic apparatus comprising:
a receiver configured to receive a reception signal of a first frequency band from a first communication apparatus;
a signal addition circuit configured to add a calibration signal of a second frequency band which is different from the first frequency band to the reception signal;
an estimation circuit configured to estimate characteristics of the receiver based on an output signal of the receiver related to the reception signal and the calibration signal;
a correction circuit configured to correct the output signal of the receiver based on an estimation result of the estimation circuit; and
a transmitter configured to transmit an output signal of the correction circuit to a second communication apparatus which is different from the first communication apparatus,
wherein:
the second frequency band includes different frequency bands; and
a center of gravity in a frequency direction of power of the calibration signal is within the first frequency band.

19. A method comprising:
receiving, by a receiver, a reception signal of a first frequency band from a first communication apparatus;
adding, by a signal addition circuit, a calibration signal of a second frequency band which is different from the first frequency band to the reception signal;
estimating, by an estimation circuit, characteristics of the receiver based on an output signal of the receiver related to the reception signal and the calibration signal;
correcting, by a correction circuit, the output signal of the receiver based on an estimation result of the estimation circuit; and
transmitting, by a transmitter, an output signal of the correction circuit to a second communication apparatus which is different from the first communication apparatus,
wherein:
the second frequency band includes different frequency bands; and
a center of gravity in a frequency direction of power of the calibration signal is within the first frequency band.

* * * * *